US012315975B2

(12) United States Patent
Chen et al.

(10) Patent No.: US 12,315,975 B2
(45) Date of Patent: May 27, 2025

(54) FUEL CELL WITH SIMULTANEOUS CHARGING AND DISCHARGING FUNCTION

(71) Applicant: Thunderzee Industry Co., Ltd., Grand Cayman (KY)

(72) Inventors: Rong-Jie Chen, New Taipei (TW); Chih-Hung Lin, San Jose, CA (US)

(73) Assignee: Thunderzee Industry Co., Ltd. (KY)

( * ) Notice: Subject to any disclaimer, the term of this patent is extended or adjusted under 35 U.S.C. 154(b) by 917 days.

(21) Appl. No.: 17/483,770

(22) Filed: Sep. 23, 2021

(65) Prior Publication Data

US 2022/0077484 A1 Mar. 10, 2022

Related U.S. Application Data

(63) Continuation-in-part of application No. 17/148,573, filed on Jan. 14, 2021, now Pat. No. 11,158,862.

(60) Provisional application No. 62/961,668, filed on Jan. 15, 2020.

(51) Int. Cl.
*H01M 8/18* (2006.01)
*H01M 8/04186* (2016.01)
*H01M 12/06* (2006.01)

(52) U.S. Cl.
CPC ....... *H01M 8/188* (2013.01); *H01M 8/04186* (2013.01); *H01M 12/065* (2013.01)

(58) Field of Classification Search
CPC .................................................... H01M 8/188
See application file for complete search history.

(56) References Cited

U.S. PATENT DOCUMENTS

2005/0031919 A1* 2/2005 Ovshinsky .............. H01M 4/96
429/514

FOREIGN PATENT DOCUMENTS

WO    WO-2019131341 A1 *  7/2019  .............. H01M 2/40

* cited by examiner

*Primary Examiner* — Brian R Ohara
(74) *Attorney, Agent, or Firm* — Andy M. Han; Han IP PLLC

(57) ABSTRACT

Various embodiments of fuel cells and cell assemblies and methods of using the same are provided. Each fuel cell or cell assembly can simultaneously perform a charging function and a discharging function, the former by receiving electric currents from external charging devices, the latter by outputting an electric current to an electrical load. The fuel cell includes a metal layer serving as a positive electrode for the charging function, at least one air electrode layer serving as a positive electrode for the discharging function, as well as a zinc material serving as a negative electrode for both the charging and discharging functions. The fuel cell also includes a plurality of gas chambers via which an electrolyte is disposed into the fuel cell. The electrolyte is disposed up to a level located lower than the gas chambers.

20 Claims, 24 Drawing Sheets

FUEL CELL WITH SIMULTANEOUS CHARGING AND DISCHARGING FUNCTION

CROSS-REFERENCE TO RELATED PATENT APPLICATIONS

The present disclosure is part of a continuation of U.S. patent application Ser. No. 17/148,573, filed on 14 Jan. 2021, which claims the priority benefit of Provisional Application No. 62/961,668, filed on 15 Jan. 2020. The aforementioned application is incorporated by reference in its entirety.

TECHNICAL FIELD

The present disclosure generally related to a fuel cell. In particular, the present disclosure is directed to an air fuel cell with multiple electric connectors and each electric connector serves as an electrode of the air fuel cell which includes zinc negative electrodes, air positive electrodes, a positive electrode for charging and an electrolyte which regulates an activated mode and a deactivated mode of the air fuel cell.

BACKGROUND

In the present disclosure, "battery cell", "battery", "cell", "fuel cell" are interchangeably used to refer to an electrochemical device that is capable of holding energy stored in a form of electric charges at a certain electric potential. Moreover, the electrochemical device is capable, through a discharging process, of draining or otherwise releasing the stored energy in a form of an electric current, which often passes through an electrical load that receives or otherwise consumes the stored energy. The electric current provided by the battery to the load through the discharging process may be referred as an output current of the battery. The output current may be provided at a certain output voltage that may or may not be varying. After the energy stored in a battery drains low due to the discharging process, a charging or recharging process may be applied to the battery to restore or otherwise bring up the energy level therewithin. The charging process generally involves imposing an electric current (referred as a charging current) to the drained battery at a certain electric potential (referred as a charging voltage) from an external source. After the charging process, the battery is again holding energy that can be released through another round of discharging process.

Fuel cell energy dominates a scientific field which is directed to directly converting chemical energy into electrical energy. A fuel cell has high-density energy in the process of energy generation, and the electrical energy comes from the potential difference between the positive electrode and the negative electrode, and results in little pollution to the environment at the same time. Therefore, a fuel cell is widely researched by academia and the industry to lead to revolutionary improvement to the global carbon (petrochemical) emission phenomenon, energy shortage and environmental pollution.

The internal configuration of a conventional zinc-air fuel cell (ZAFC) is mostly composed of an air electrode, a zinc anode, a liquid storage space, and an electrolyte. A conventional zinc-air fuel cell (ZAFC) is usually a manually replaceable cell. In other words, the electrodes or the electrolyte of such cell is only manually replaceable to regenerate its electric capacity. A zinc-air fuel cell may discharge or be charged. The discharge reaction may involve the following half-reactions:

The negative electrode:

I. $Zn + 4OH^- \rightarrow Zn(OH)_4^{2-} + 2e^-$

I. $Zn(OH)_4^{2-} \rightarrow ZnO + H2O + 2OH^-$

The positive electrode:

$\frac{1}{2}O_2 + H_2O + 2e^- \rightarrow 2OH^-$

The overall reaction is:

$Zn + \frac{1}{2}O_2 \rightarrow ZnO$

On the other hand, the charge reaction may involve the following half-reactions:

The cathode:

I. $ZnO + H_2O + 2OH^- \rightarrow Zn(OH)_4^{2-}$

II. $Zn(OH)_4^{2-} + 2e^- \rightarrow Zn + 4OH^-$

The anode:

$2OH^- \rightarrow \frac{1}{2}O2 + H2O + 2e^-$

The overall reaction is:

$ZnO \rightarrow Zn + \frac{1}{2}O_2$

Zinc oxide is reduced to nano-scale zinc in the presence of an alkaline electrolyte in electrolysis.

When left unused or after used for a long time, the polarization, the passivation and the dendrite growth of the zinc anode led to rapid corrosion of the zinc anode, worse performance of the zinc-air fuel cell, the acidification of the electrolyte and reduced battery life due to continuous soaking of the air electrode and of the zinc anode in the electrolyte. Although the presence of a zinc-air fuel cell structure with three electrodes is available, it fails to solve the problems such as high current recharging and discharging and redox efficiency, and the problem of leakage of a zinc air fuel cell still remains unsolved. Further, conventional fuel cells cannot effectively deal with the cycle blocking problem of single battery and multiple series and parallel batteries.

SUMMARY

The primary object of the present disclosure resides in the partial or complete removal of the electrolytic solution in the cell when the zinc-air fuel cell with multiple electric connectors of the present disclosure is kept in an unused state, to further avoid the contact of the anode structures with the electrolytic solution to stop the electrochemical reaction and to avoid the corruption or surface peeling of the anode structures or cathode structures as well as to extend the storage life or the service life of the air fuel cell.

The secondary object of the present disclosure resides in the design of a zinc-air fuel cell with multiple electric connectors which have positive electrodes and negative electrodes so that a single cell itself may undergo a chemical reaction of charge or a chemical reaction of discharge at the same time without the need of manual replacement of the electrodes or electrolyte.

Another object of the present disclosure enables the input or output of at least one of the zinc material and the electrolytic solution through a transport device into or out of the zinc-air fuel cell with multiple electric connectors of the present disclosure so as to promote the replacement or the renewal operation process of the zinc material or of the electrolytic solution to double the efficiency of the operation process. The design of the zinc-air fuel cell may provide multiple gas chambers to reduce the cycle blocking problem of a single battery.

Yet another object of the present disclosure is to provide a fuel cell assembly that is capable of simultaneously performing a charging function and a discharging function. The fuel cell assembly may include a plurality of fuel cells arranged in a stacking structure. The plurality of fuel cells may be wired in various wiring configurations to provide respective advantages in performing the charging and discharging functions, as each configuration may fit for different applications.

In order to achieve the above-mentioned objects, a zinc-air fuel cell with multiple electric connectors is provided. The zinc-air fuel cell with multiple electric connectors according to an aspect of the present disclosure includes a case forming a space that is internal to the zinc-air fuel cell; a metal layer disposed in the space and serving as a positive electrode for the charging function; a first air electrode layer and a second air electrode layer disposed in the space and serving as positive electrodes for the discharging function, the first and second air electrode layers each disposed on two opposite sides of the metal layer; a zinc material disposed in the space and serving as a negative electrode for the charging function and the discharging function; a first conductive layer and a second conductive layer each disposed between the metal layer and one of the first air electrode layer and the second air electrode layer, each of the first and second conductive layer having a central recessed region for accommodating the zinc material; a plurality of separators respectively disposed between the first and second air electrode layers, the first and second conductive layers and the metal layer so that the first and second air electrode layers, the first and second conductive layers and the metal layer are separately arranged; an electrolyte disposed in the space, the electrolyte capable of flowing to pass through the separators and in contact with the air electrode layers, with the metal layer and with the zinc material so that the air electrode layers, the zinc material and the metal layer are respectively electrically connected; and a plurality of gas chambers disposed in the space. Moreover, the electrolyte is disposed in the space via at least one of the plurality of gas chambers that are configured to pass but not to hold the electrolyte. Also, the electrolyte is disposed in the space up to a level that is located lower than the plurality of gas chambers.

The zinc material is selected from a group consisting of flowable zinc slurry, zinc particles and a zinc plate. The embodiments of the conductive layers may be different to correspond to the selection of the zinc material. The flowable zinc slurry may be in a form of "mortar-like", such as a mixture of zinc particles, a liquid and some optional additives. The viscosity of the flowable zinc slurry is related to its circulation speed. The faster the circulation speed is, the lower the viscosity, and the slower the circulation speed is, the higher the viscosity.

Furthermore, when a flat surface for supporting the cell is used as a horizontal reference, the air electrode layers, the metal layer and the zinc material are configured to be vertically arranged with respect to the flat surface. This configuration is different from the conventional upright position of lateral arrangement. The zinc material may include a flowable zinc slurry, a zinc particle or a zinc plate.

The zinc-air fuel cell with multiple electric connectors may further include a transport device. The transport device is connected to the space and capable of outputting or inputting the electrolyte, thereby changing the height position of the electrolyte in the space. By changing the total amount of the electrolyte in the space and the internal structure which the height of a liquid may contact, the contact of the structure at a specific height with the liquid and the contact of the position in the space with the liquid may be avoided and the corruption of a specific structure or surface peeling may be prevented.

The present disclosure is characterized in that the zinc material of the present disclosure is used as a negative electrode, and the air electrode layers and the metal layer are respectively used as positive electrodes. The positive electrodes and the negative electrodes may collectively or individually form the multiple electric connectors in a zinc-air fuel cell.

In addition, the transport device connecting the space may change the total amount of the electrolyte and the liquid height of the electrolyte by removing most of the electrolyte out of the space to avoid the contact of the electrolyte with the internal structure in the space when the zinc-air fuel cell with multiple electric connectors of the present disclosure is in storage or not in use, to avoid the undesirable self-discharging or charging reaction of the zinc-air fuel cell with multiple electric connectors of the present disclosure and to avoid the corruption or surface peeling of the internal structure in the space so as to extend the storage life or the service life of the zinc-air fuel cell with multiple electric connectors of the present disclosure.

In addition to the zinc-air fuel cell, the present disclosure also provides various embodiments of a cell assembly comprising a plurality of fuel cells, as described above, that are arranged in a stacking structure. Different configurations of the cell assembly may be achieved by various inter-cell and/or intra-cell connections. Each configuration may perform a corresponding charging function and a corresponding discharging function, whereas the cell assembly is capable of performing the charging function and discharging function simultaneously.

Besides various embodiments of the fuel cell and the cell assembly, still another object of the present disclosure is to provide the present disclosure further provides methods of using the fuel cell and/or the cell assembly to perform a charging function which involves receiving one or more electric currents from one or more charging devices, as well as a discharging function which involves sending one or more electric currents to one or more electrical loads. The charging function and the discharging function can be performed or otherwise operated by the fuel cell or the cell assembly simultaneously. That is, the fuel cell or the cell assembly can perform the charging function while it performs the discharging, and vice versa.

BRIEF DESCRIPTION OF THE DRAWINGS

In order to clearly explain specific embodiments according to the present disclosure or technical solutions according to prior art, a brief description of accompanying drawings required by descriptions on the specific embodiments or the prior art is given below. Obviously, the drawings described as follows illustrate certain embodiments of the present disclosure. For an ordinary one skilled in the art, without any creative work, other drawings may also be derived or otherwise obtained according to these drawings.

DETAILED DESCRIPTION OF THE PREFERRED EMBODIMENTS

Figure 1:
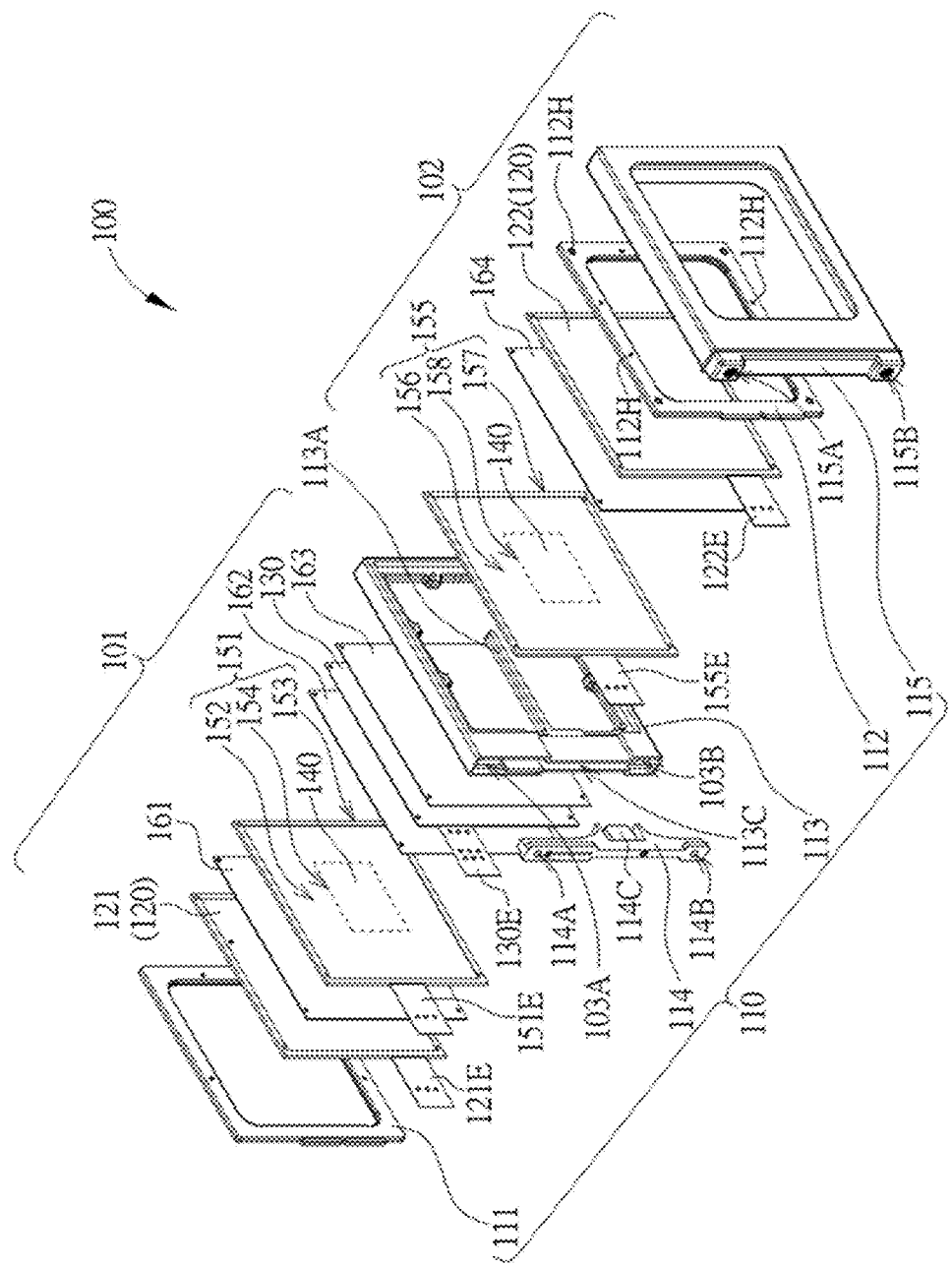
FIG. 1 illustrates a schematic diagram of an embodiment of an explosive diagram of a cell structure of the present disclosure.

Various exemplary embodiments according to the present disclosure are described in detail hereafter and shown in the drawings. In the description with reference to the drawings, the same reference numbers in the drawings denote elements having a same or similar function, unless otherwise stated. Not all of the possible embodiments consistent with the present disclosure are disclosed herein. Instead, only several non-limiting exemplary embodiments are described hereinafter referring to the system examples according to an aspect of the present disclosure or according to the details described in the attached claims.

The drawings herein, as an integral part of the present disclosure, is intended to illustrate or otherwise demonstrate inventive principles of the present disclosure as applied to the various embodiments disclosed herein. Unless stated otherwise, any mentioning of a physical direction or orientation regarding an embodiment herein is for the convenience of explaining the inventive ideas of the present disclosure in view of the embodiment, rather than limiting the inventive ideas only to the specific direction or orientation mentioned. For example, terms describing a relative physical relationship, such as "upward". "downward", "vertical", "horizontal", "on top of", "underneath", "above", "below", "top", "bottom", as well as other derivative adjectives, adverbs, or terms, are used with a sole intention to describe features of an embodiment, which may be as shown in the drawings, but not to limit the features to being only so structured or operated in the specific direction or orientation, unless such a limitation is specifically stated in the description.

As one skilled in the art will understand, electronic equipment manufacturers may refer to a component by different names. This document does not intend to distinguish between components that differ in name but not function. In the following description and in the claims, the terms "include", "comprise" and "have" are used in an open-ended fashion, and thus should be interpreted to mean "include, but not limited to". Although terms such as first, second, third, etc., may be used to describe diverse constituent elements, such constituent elements are not limited by the terms. The terms are used only to discriminate a constituent element from other constituent elements in the specification. The claims may not use the same terms, but instead may use the terms first, second, third, etc. with respect to the order in which an element is claimed. Accordingly, in the following description, a first constituent element may be a second constituent element in a claim.

When an element or layer is referred to as being "on", "connected to", "attached to", "coupled with" or "interlinked with" another element or layer, it may be directly on or directly connected to the other element or layer, or intervening elements or layers may be presented. Unless stated otherwise, a connection may be a fixed connection wherein the two connected parts do not have a relative movement, or a flexible connection wherein the two connected parts may have a relative movement.

The various embodiments disclosed herein are for the purpose of serving as examples for demonstrating inventive features and benefits of the present disclosure. That is, the inventive principles of the present disclosure are not limited to the applications of the exemplary embodiments. Any application utilizing one of the inventive features described herein, or a combination of a few inventive features thereof, is within the scope of the present disclosure. The scope of the present disclosure is limited only by the claims presented herein.

In the present disclosure, the terms "cell structure" and "fuel cell" are interchangeably utilized throughout. FIG. 1 illustrates an embodiment of an explosive diagram of a cell structure with respect to the zinc-air fuel cell with five electric connectors of the present disclosure. For example, a cell structure 100 may have five electric connectors and include elements such as a case set 110, air electrode layers, a metal layer 130, a zinc material 140, conductive layers and a plurality of separators. The cell structure 100 may structurally have multiple portions to assemble, for example a left portion, a right portion and a central portion, but the present disclosure is not limited to these.

The case set 110 may include a plurality of case elements. A plurality of the case elements together may collectively form the case set 110 to serve as the cell case of the cell structure 100. For example, the case set 110 may include a first housing in the form of a frame, a second housing in the form of a frame, a third housing in the form of a frame and a fourth housing in the form of a frame, but the present disclosure is not limited to these. The first housing, the second housing, the third housing and the fourth housing may collectively form space to accommodate other elements of the cell structure 100, define gas chambers to buffer the input circulation or the output circulation of a fluid for use in the zinc-air fuel cell with five electric connectors and provide solid support for the cell structure 100.

For example, the first housing may be a left housing 111 in the left portion. The second housing may be a right housing 112 in the right portion. The central housing 113 may be a central housing 113 in the central portion. The case set 110 may further include a lid 114 to be connected to central housing 113 to form channels for the circulation of fluids. The fourth housing may be a case housing 115 to accommodate the left housing 111, the right housing 112, the central housing 113 and the lid 114. Each housing or lid may have a complementary structure with respect to one another, such as one or more holes for fastening two pieces of housing or of lid or for snapping up two pieces of housing or of lid, to facilitate the mutual engagement to obtain a cell structure 100 to improve the air tightness and/or the leak-proof property of the cell structure 100.

In some embodiments, the right housing 112 may have one or more holes 112H for the engagement with the case housing 115. For example, the holes 112H may help an adhesive (not shown) to temporally hold the right housing 112 and the case housing 115 together by fastening the frames of the right housing 112 and of the case housing 115. The right housing 112 and the case housing 115 may be subjected to a subsequent insert molding method to form a permanent sealed structure, such as an air-tight and/or a leak-proof cell structure, in the presence of the holes 112H and the adhesive (not shown). The left housing 111, the central housing 113, the lid 114 and the case housing 115 may have similar hole(s) for similar use, but the present disclosure is not limited to these. In some embodiments, two adjacent elements may have complementary components for mutual engagement. For example, the central housing 113 may have a central housing region 113C to correspond to a central lid piece 114C of the lid 114. The central housing region 113C may have a complementary recess with respect to the central lid piece 114C to facilitate the mutual engagement of the two specific parts for fastening the two elements or for snapping up the two elements, but the present disclosure is not limited to these.

The case set 110 may include a polyarylsulfone material to enhance the mechanical strength of the cell structure 100. For example, at least one of the left housing 111, the right housing 112, the central housing 113, the lid 114 and the case housing 115 may include the polyarylsulfone material. The polyarylsulfone material may improve the adherence of the interface between two materially different substances, for example an organic polymer and a metallic material. Further, the polyarylsulfone material may be subjected to an insert molding method to obtain one of the housings or the lid to improve the air tightness and/or the leak-proof property of the cell structure 100. The present disclosure may use a polyarylsulfone material-based resin as the substrate for the insert molding method to encapsulate the elements in the zinc-air fuel cell to eliminate the problem of liquid leakage in the prior art. For example, a better air tightness property may decrease the possibility of a gas leak and a better leak-proof property may decrease the possibility of an electrolyte leak. The air tightness property and/or the leak-proof property may increase a fluid sealing property or the reliability of the cell structure 100.

The polyarylsulfone material may be thermoplastics with sulfonyl groups. In some embodiments of the present disclosure, the polyarylsulfone material may be polysulfones (PSF, PSU), polyethersulfones (PES, PESU), polyarylethersulfones (PAES) and polyphenylene sulfones (PPSU, PPSF), but the present disclosure is not limited to these.

The left housing 111 along with the central housing 113 together may form a first space, for example a left space 101 in the left portion. The left space 101 may accommodate and fasten one air electrode layer, a metal layer, a zinc material, one conductive layer, multiple separators and the electrolyte 170. Similarly, the right housing 112 along with the central housing 113 together may form a second space, for example a right space 102 in the right portion. The right space 102 may accommodate and fasten one air electrode layer, a metal layer, a zinc material, one conductive layer, multiple separators and the electrolyte 170.

The central housing 113 may have a plurality of gas chambers, such as two gas chambers, for example a first gas chamber 103A and a second gas chamber 103B. The gas chambers may be disposed in the space, for example the first gas chamber 103A and the second gas chamber 103B may be disposed in the left space 101 and in the right space 102. In other words, the first gas chamber 103A, the second gas chamber 103B, the left space 101 and the right space 102 may be mutually connected in terms of accommodation to facilitate the continuous circulation of fluids for use in the air fuel cell. The first gas chamber 103A or the second gas chamber 103B may independently help buffer the fluid circulation of the zinc metal fuel.

The central housing 113 may further have a guide column 113A, disposed between the first gas chamber 103A and the second gas chamber 103B, or between the left space 101 and the right space 102 for example, to help buffer or guide the fluid circulation of the zinc metal fuel. The fluid circulation may include at least one of a gas circulation and an electrolyte circulation.

The lid 114 and the central housing 113 together may define the first gas chamber 103A or the second gas chamber 103B. The lid 114 may further have holes. For example, the lid 114 may have a first hole 114A and a second hole 114B. The first hole 114A and the second hole 114B may respectively correspond to the first gas chamber 103A and the second gas chamber 103B. The holes may allow a fluid entering or leaving the first gas chamber 103A or the second gas chamber 103B.

The case housing 115 may further have openings. For example, the case housing 115 may have a first opening 115A and a second opening 115B. The first opening 115A and the second opening 115B may respectively correspond to the first hole 114A and the second hole 114B. The openings may allow a fluid entering or leaving the cell structure 100 by passing through the first gas chamber 103A or through the second gas chamber 103B.

An air electrode set 120 may include two air electrode layers. For example the air electrode set 120 may include a left air electrode layer 121 disposed and fastened in the left space 101 and a right air electrode layer 122 disposed and fastened in the right space 102. The left air electrode layer 121 or the right air electrode layer 122 may collectively or individually serve as a positive electrode for discharge in a predetermined chemical reaction. An air electrode may serve as an anode of an air cell. An air electrode layer may include a metal mesh, a waterproof and breathable layer and a catalytic layer which are pressed together. The air electrode layer may accommodate the oxygen gas serving as a positive electrode in the air to react with the fuel (Al, Mg, Zn . . . etc.) in the negative electrode along with an electrolyte in the presence of active carbon and of a catalyst to generate electric energy.

The left air electrode layer 121 or the right air electrode layer 122 may respectively include a metallic material, such as Ni, but the present disclosure is not limited to this. Each air electrode layer may further have an extending strip to serve as an electric connector for the electric current. For example, the left air electrode layer 121 may have a left discharging positive electric connector 121E, and the right air electrode layer 122 may have a right discharging positive electric connector 122E.

A metal layer 130 may be disposed in one of the spaces, for example in the left space 101 or in the right space 102. FIG. 1 illustrates an embodiment of the metal layer 130 disposed in the left space 101 and between the left air electrode layer 121 and the central housing 113, but the present disclosure is not limited to these. The metal layer 130 may include a metallic material, such as Ni, but the present disclosure is not limited to this. The metal layer 130 may further include a stainless steel layer, such as a 316 stainless steel mesh. The metal layer 130 may serve as a positive electrode for charge in the chemical reaction. The metal layer 130 may further have an extending strip to serve as an electric connector for the electric current. For example, the metal layer 130 may have a charging positive electric connector 130E.

A zinc material 140 may be disposed in the spaces to serve as a chemically active negative electrode for the charge/discharge reaction. For example, the zinc material 140 may be a negative electrode to go with the air electrode layers (positive electrodes) for discharge in the chemical reaction. Or, the zinc material 140 may be a negative electrode to go with the metal layer 130(a positive electrode) for charge in the chemical reaction. The zinc material 140 may include at least one of a flowable zinc slurry, zinc particles and a zinc plate to serve as a fuel of the zinc-air fuel cell with five electric connectors of the present disclosure. The flowable zinc slurry may be in a form of mortar-like, such as a mixture of zinc particles, liquids and some optional additives. The viscosity of the flowable zinc slurry is related to its circulation speed. The faster the circulation speed is, the lower the viscosity is. The liquid may include an electrolyte solution.

A conductive set may include two conductive layers disposed on two sides of the spaces, but the present disclosure is not limited to these. For example the conductive set may include a left conductive layer 151 disposed and fastened on the left side, i.e. in the left space 101 and a right conductive layer 155 disposed and fastened on the right side, i.e. in the right space 102. The conductive set may be disposed adjacent to the zinc material 140 or further, in contact with the zinc material 140.

In some embodiments, at least one of the left conductive layer 151 and the right conductive layer 155 may be in direct contact with the zinc material 140 to accommodate the zinc material 140. A conductive layer may have a recess to accommodate the zinc material 140. For example, the left conductive layer 151 may have a central region 152 and a peripheral region 153. The central region 152 may be lower than the peripheral region 153 to form a left recess 154. The left recess 154 may accommodate the zinc material 140 to undergo the chemical reaction. Similarly, the right conductive layer 155 may have a central region 156 and a peripheral region 157. The central region 156 may be lower than the peripheral region 157 to form a right recess 158. The right recess 158 may accommodate the zinc material 140 to undergo the chemical reaction.

One conductive layer may serve as a structural electrode to accommodate the chemically active zinc material 140 so one of the conductive layers may support the zinc material 140 to undergo the chemical reaction. Further, one of the conductive layers may serve as an electric current channel to transfer the electrons involved in the chemical reaction. The materials of the conductive layers may be electrically conductive, chemically inactive and not involved in the chemical reaction. The left conductive layer 151 or the right conductive layer 155 may respectively include a metallic material, such as Ni or Cu, but the present disclosure is not limited to these. Each conductive layer may have an extending strip to serve as an electric connector for the electric current. For example, the left conductive layer 151 may have a left negative electric connector 151E; the right conductive layer 155 may have a right negative electric connector 155E.

The zinc-air fuel cell with multiple electric connectors of the present disclosure may have multiple gas chambers, for example, the first gas chamber 103A and the second gas chamber 103B. The zinc-air fuel cell with multiple electric connectors of the present disclosure may have advantageous multiple gas chambers for buffering purpose. In addition to the improvement of the cycling efficiency of the fuel, they may also facilitate the achievement of the function of the relative balance of the internal pressure. A conventional cell structure with three electric connectors only has the fuel cycling channel, and fails to achieve the efficiency of the balanced cycling of fuel and gas in terms of space. Such structure tends to cause excessive pressure inside the cell and results in poor circulation and in low circulation efficiency.

In the case of a zinc-air fuel cell with six electric connectors of the present disclosure, the gas chamber set may be divided into four gas chambers or maintain the configuration of two gas chambers. In terms of electric connectors, the configuration may be equivalent to the series or parallel connection of two zinc-air fuel cells with three electric connectors, and the design of the configuration is optional.

In terms of multiple buffering gas chambers, for example in the case of four buffering gas chambers, they come from two divided buffering gas chambers. In addition to the purpose of the adjustment of efficiency, another purpose may reside in the separate circulation of the fuel from the gas to achieve the effect of non-synchronous circulation. For example, the non-synchronous circulation may only enable the circulation of the gas to improve the discharge efficiency, or alternatively, only enable the circulation of the fuel to improve the charging or the discharging efficiency. Six or more gas chambers function similarly.

As shown in FIG. 1, a plurality of separators may be provided in the spaces. For example, a separator 161, a separator 162 and a separator 163 may be provided in the left space 101. Another separator 164 may be provided in the right space 102. In some embodiments, the separator 161, the separator 162, the separator 163 and the separator 164 may respectively include a hydrophilic separator. A separator may be disposed between two adjacent elements to segregate the two adjacent elements and an element may be disposed between two adjacent separators. For example, the separator 161 may be disposed between the left air electrode layer 121 and the left conductive layer 151, the separator 162 may be disposed between the left conductive layer 151 and the metal layer 130, the separator 163 may be disposed between the metal layer 130 and the central housing 113, and the separator 164 may be disposed between the right conductive layer 155 and the right air electrode layer 122 so that the left air electrode layer 121, the left conductive layer 151(accommodating the zinc material 140), the metal layer 130, the central housing 113, the right conductive layer 155 (accommodating the zinc material 140) and the right air electrode layer 122 are separately arranged. The separators may allow the electrolyte 170 to pass through.

Figure 1A:
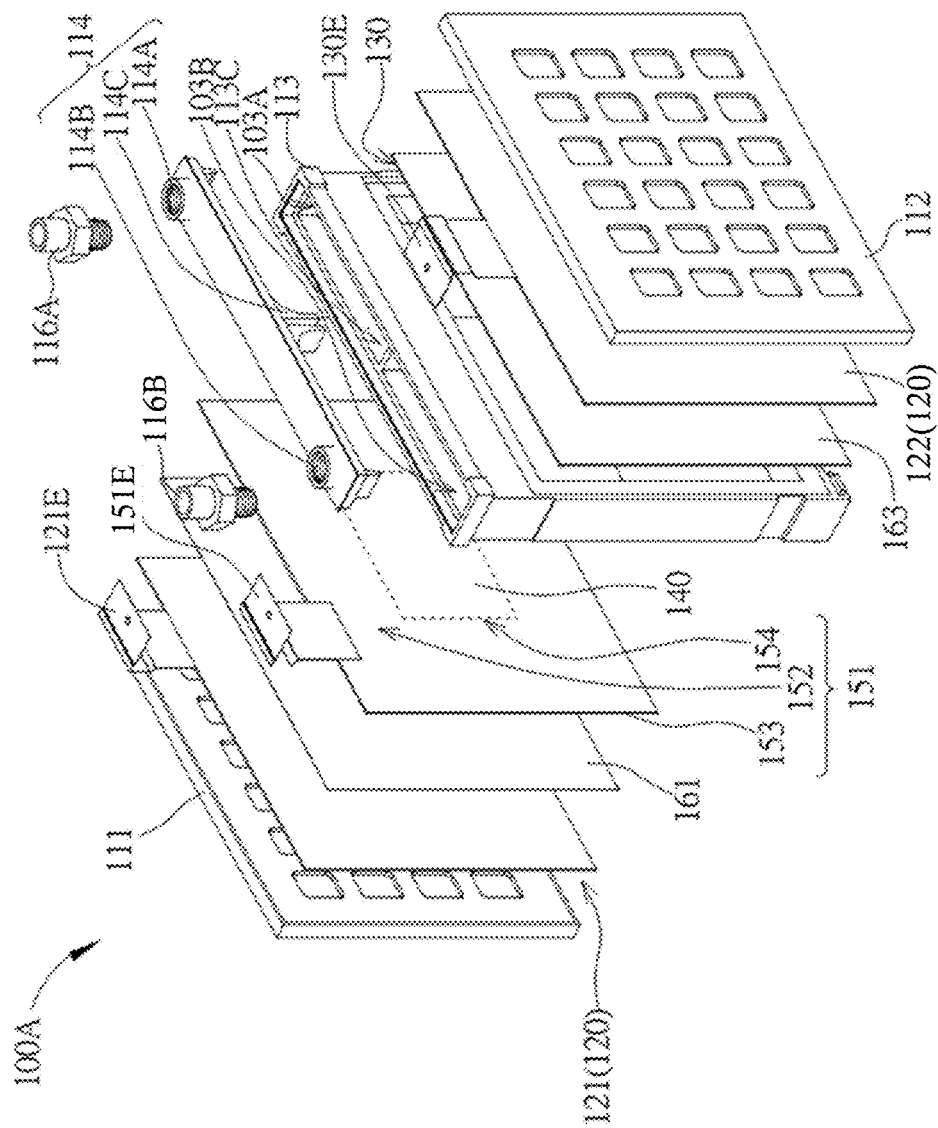
FIG. 1A illustrates a schematic diagram of an explosive view of a variant embodiment corresponding to FIG. 1 of a cell structure of the present disclosure.

FIG. 1A illustrates a schematic diagram of an explosive view of a variant embodiment corresponding to FIG. 1 of a cell structure of the present disclosure. FIG. 1A illustrates a simplified cell structure with three electric connectors of the present disclosure. The cell structure with five electric connectors 100 and the simplified cell structure with three electric connectors 100A may share a common feature of multiple gas chambers for buffering the circulation of a fluid. The main difference between the cell structure with five electric connectors 100 and the simplified cell structure with three electric connectors 100A resides in the optional right air electrode layer 122 and in the optional right conductive layer 155. In addition, the separator 164 may also be optional in the simplified cell structure with three electric connectors 100A.

The simplified cell structure with three electric connectors 100A may be useful for the application of one-sided ventilation. For example, the simplified cell structure may be useful when one side of the cell is attached to a circuit board to limit the possibility of gas exchange. The configuration of one side air electrode may result in a thinner structure and simplify the manufacture process and the molding process. The cell structure with five electric connectors 100 of double side air electrodes is better for more gas exchange to yield higher discharge efficiency.

Figure 2:
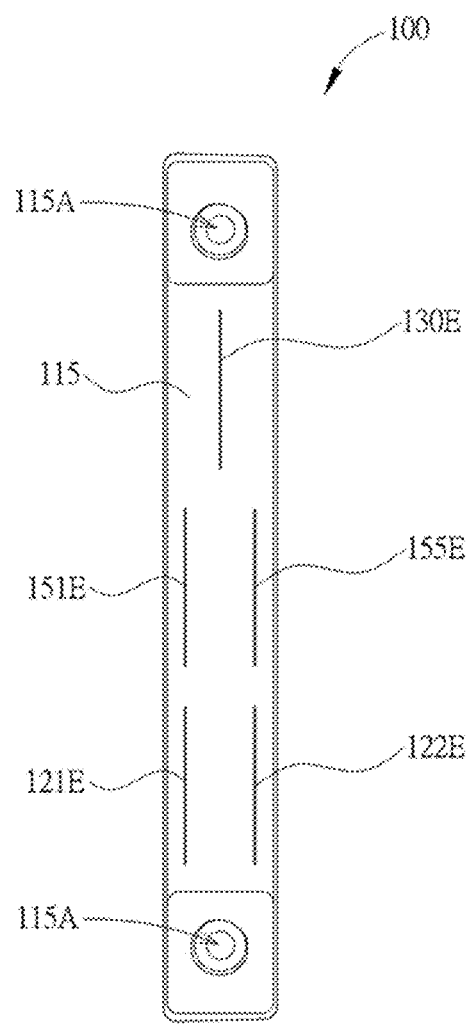
FIG. 2 illustrates a schematic diagram of a side view of an embodiment of the zinc-air fuel cell with five electric connectors corresponding to FIG. 1 of the present disclosure.

FIG. 2 illustrates a side view of an embodiment of the zinc-air fuel cell with five electric connectors of the present disclosure. Accordingly, each one of the left discharging positive electric connector 121E, the right discharging positive electric connector 122E, the charging positive electric connector 130E, the left negative electric connector 151E or the right negative electric connector 155E may serve as one electric connector in the five electric connectors of the zinc-air fuel cell of the present disclosure. Structurally speaking, the left negative electric connector 151E may be disposed between the left discharging positive electric connector 121E and the charging positive electric connector 130E; the right negative electric connector 155E may be disposed between the charging positive electric connector 130E and the right discharging positive electric connector 122E.

Figure 3:
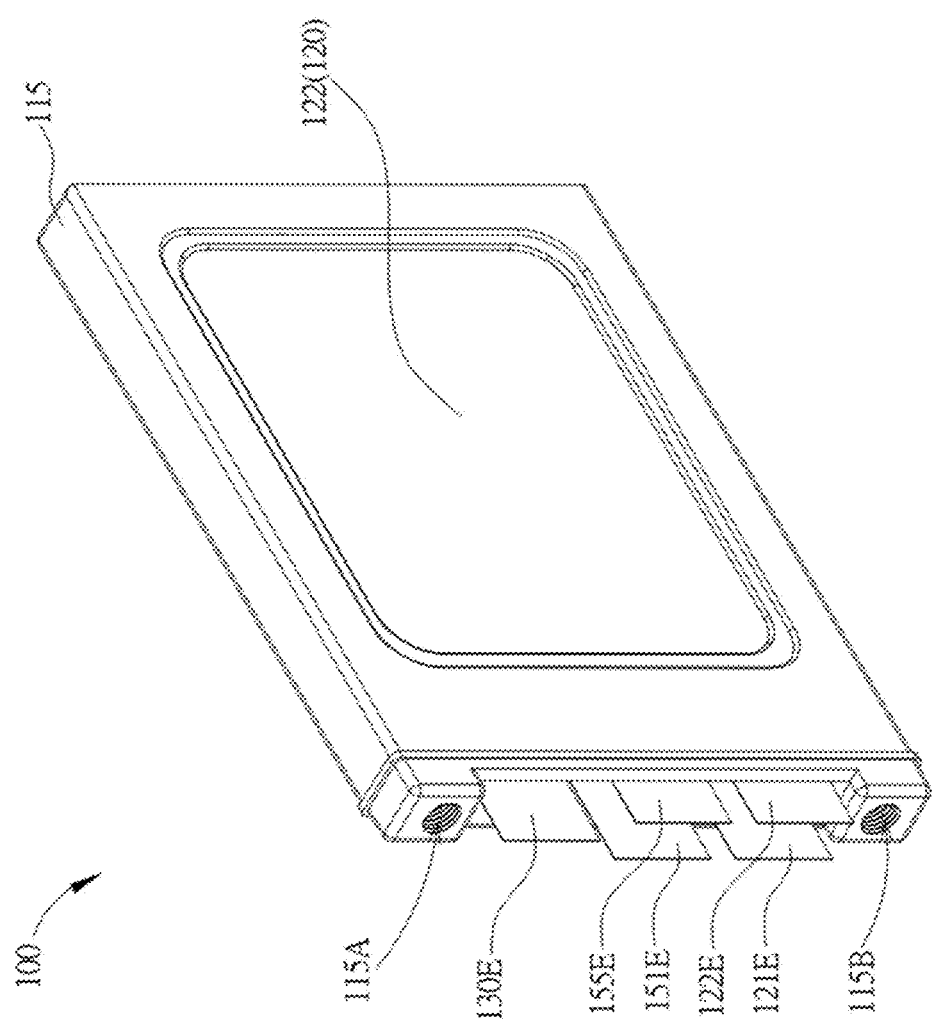
FIG. 3 illustrates a schematic diagram of a perspective view of an embodiment of the zinc-air fuel cell with five electric connectors of the present disclosure.
Figure 3A:
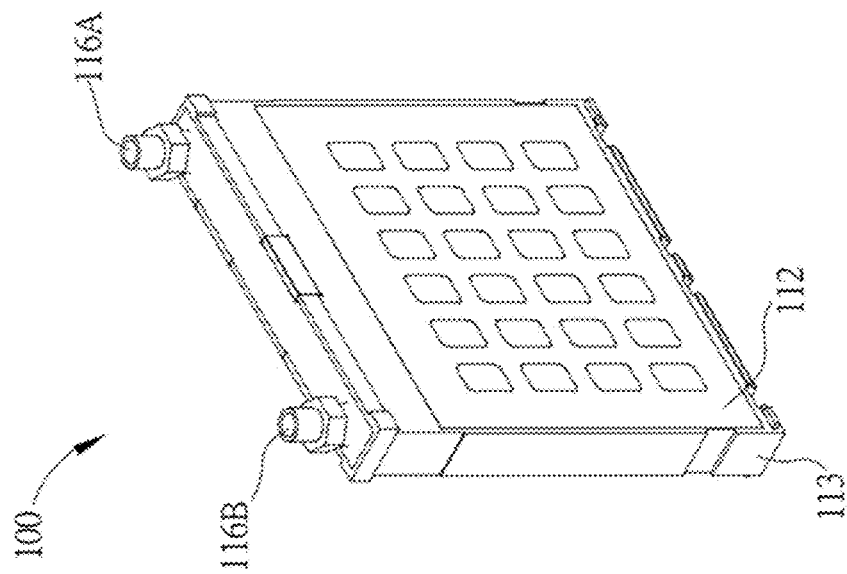
FIG. 3A illustrates another schematic diagram of a simplified perspective view corresponding to FIG. 1A of a cell structure of the present disclosure in an upright position.
Figure 4:
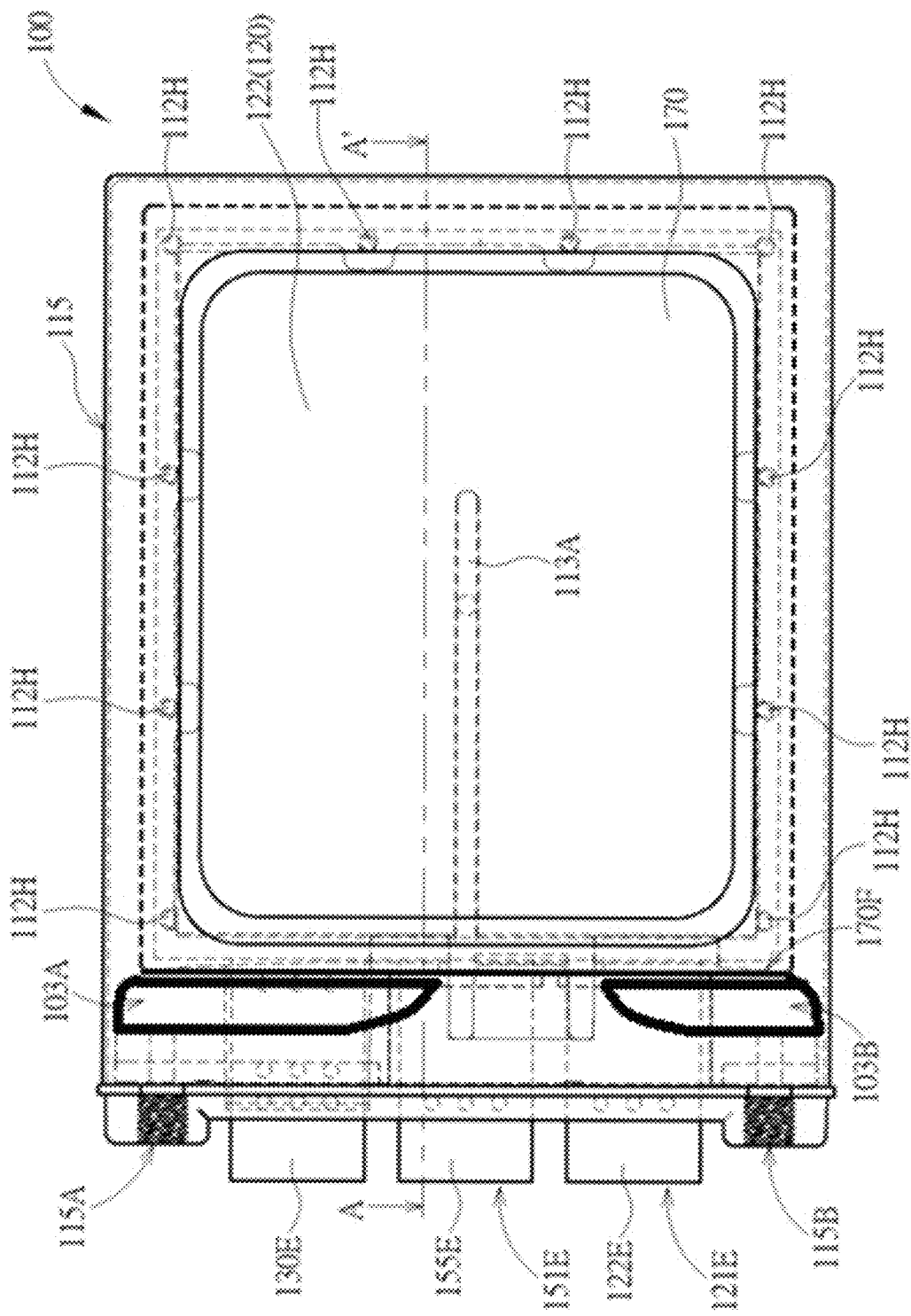
FIG. 4 illustrates a schematic diagram of a front view of an embodiment of the zinc-air fuel cell with five electric connectors of the present disclosure.
Figure 4A:
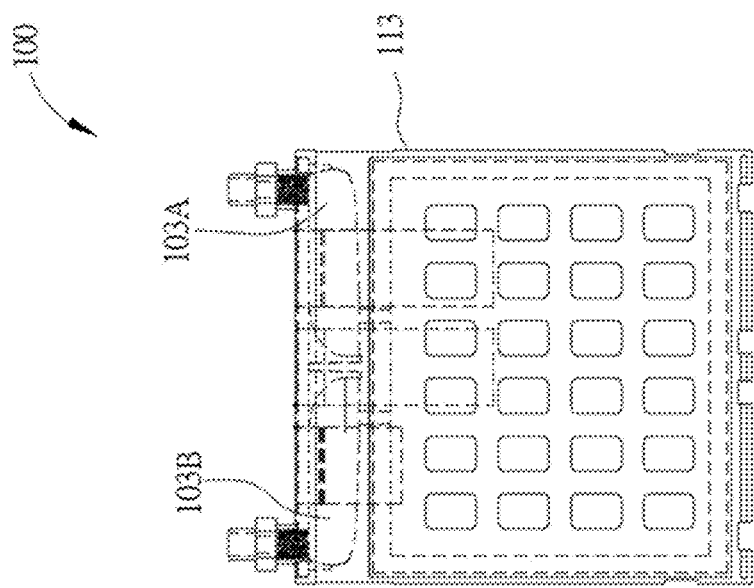
FIG. 4A illustrates another schematic diagram of a simplified front view corresponding to FIG. 1A of a cell structure of the present disclosure in an upright position.

FIG. 3 illustrates a perspective view of an embodiment of the zinc-air fuel cell with five electric connectors of the present disclosure. FIG. 4 illustrates a schematic diagram of an embodiment of the zinc-air fuel cell with five electric connectors of the present disclosure. The first opening 115A or the second opening 115B may allow a fluid to enter or leave the cell structure 100. The fluid may be selected form a group consisting of a gas, an electrolyte and a fuel. There may be some holes on some housing, for example holes 112H on the right housing 112, to help the alignment of molding, for example for use in the insert molding method.

An electrolyte 170 may optionally fill up to the full level 170F or circulate within the first gas chamber 103A, the second gas chamber 103B, the left space 101 and the right space 102, and flow to pass through the separators, such as the separator 161, the separator 162, the separator 163 and the separator 164. The electrolyte 170 may be a liquid electrolyte, such as an electrolytic solution including an aqueous alkaline solution. The aqueous alkaline solution may include an electrolytic solute and a solvent. In some embodiments, the electrolytic solute may include a hydroxide such as potassium hydroxide, and a solvent such as water. The hydrophilic separators, such as those commercially available from Du Pont, may selectively allow polar molecules, such as water molecules, potassium ions and hydroxide ions to pass through, and zinc is not allowed to pass through, but the present disclosure is not limited thereto. The electrolyte 170 may be in contact with at least one of the air electrode layers, of the metal layer 130 and of the zinc material 140 so that the air electrode layers, the zinc material 140 and the metal layer 130 are respectively electrically connected to undergo a discharge reaction or a charge reaction.

Figure 5:
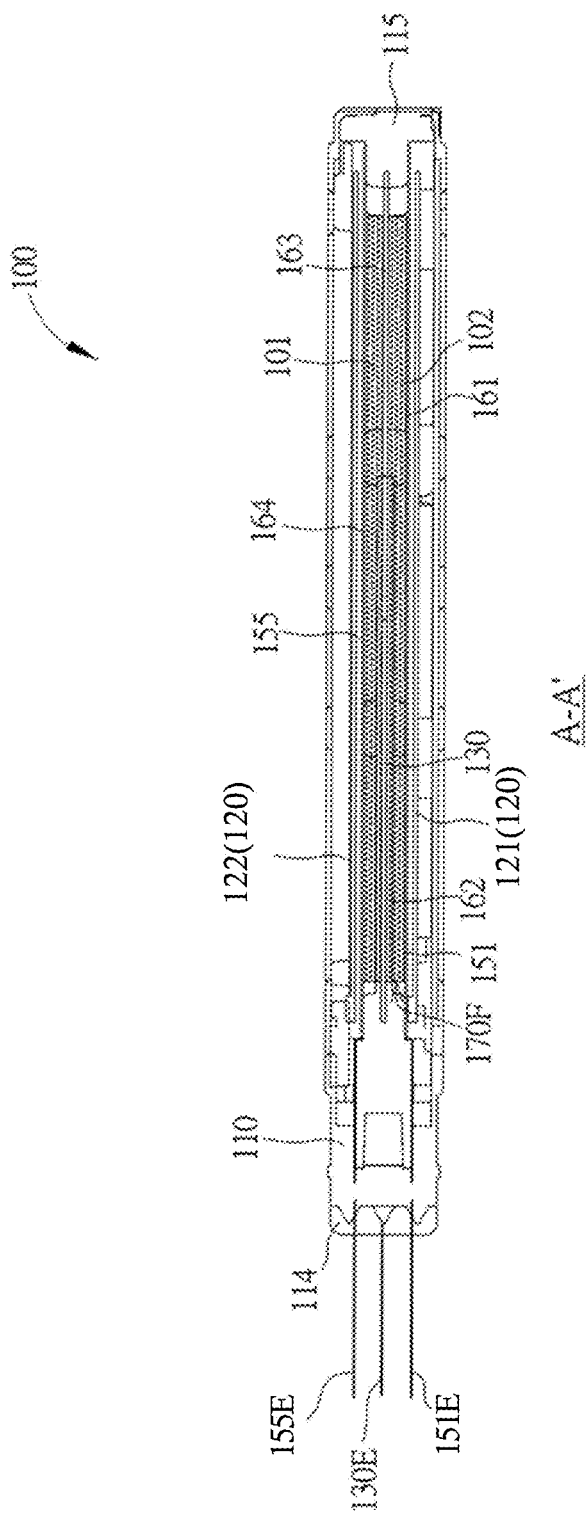
FIG. 5 illustrates a schematic diagram of a cross-sectional view along line A-A' in FIG. 4 of an embodiment of the zinc-air fuel cell with five electric connectors of the present disclosure in a horizontal position.
Figure 5A:
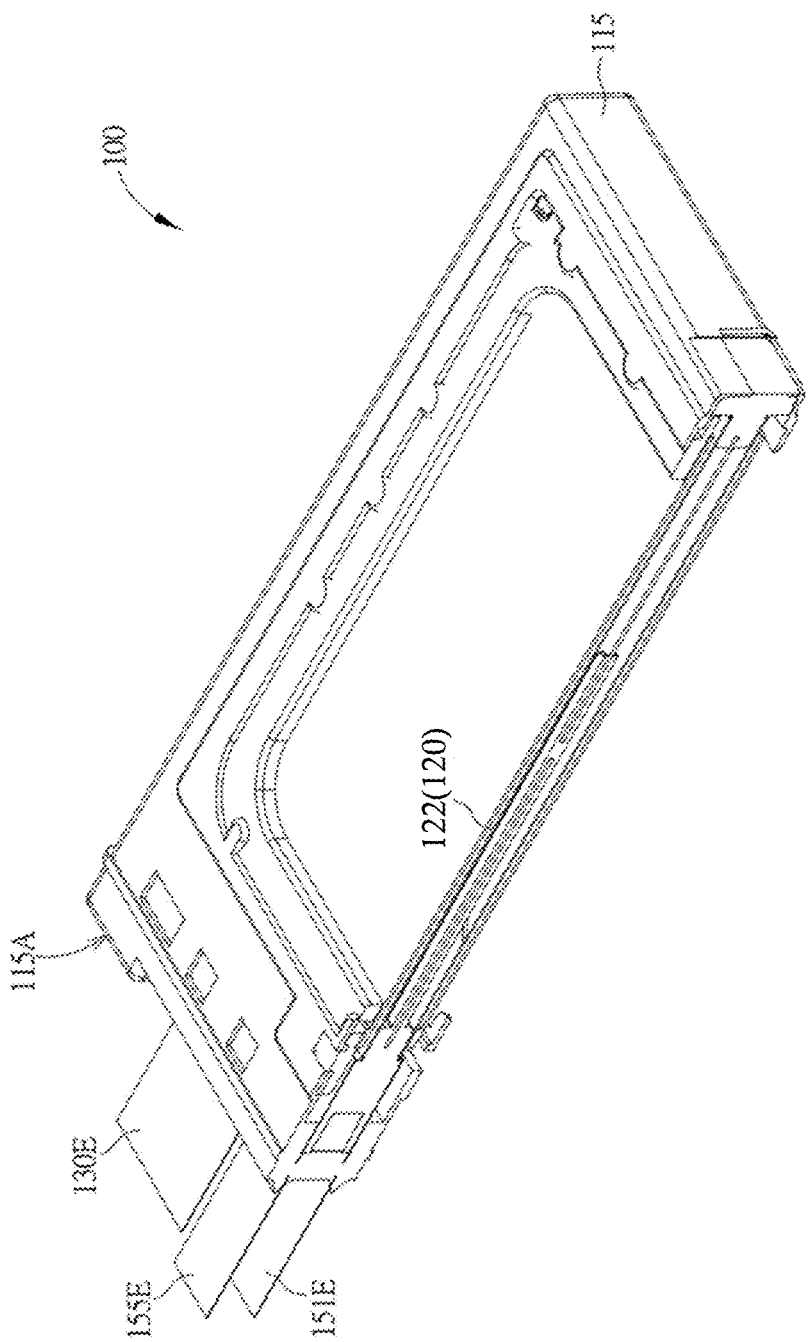
FIG. 5A illustrates a schematic diagram of a perspective view corresponding to FIG. 5 of an embodiment of the zinc-air fuel cell with five electric connectors of the present disclosure in a horizontal position.

FIG. 5 illustrates a schematic diagram of a cross-sectional view of an embodiment along line A-A' in FIG. 4 of the zinc-air fuel cell with five electric connectors of the present disclosure in a horizontal position. FIG. 5A illustrates a schematic diagram of a perspective view corresponding to FIG. 5 of an embodiment of the zinc-air fuel cell with five electric connectors of the present disclosure in a horizontal position. As shown in FIG. 5, the air electrode set 120 including a left air electrode layer 121 and a right air electrode layer 122, the metal layer 130, the zinc material 140 accommodated in the conductive set may be configured to be vertically arranged with respect to a flat surface, i.e., a stacking structure if the flat surface (not shown) for supporting the cell is used as a horizontal reference. For example, the left air electrode layer 121 may be the topmost layer, the zinc material 140 may be the bottommost layer, and the metal layer 130 may be disposed between the left air electrode layer 121 and the zinc material 140. This novel configuration is different from the conventional upright position of lateral arrangement.

The present disclosure relates to a fuel cell with a zinc material and air to undergo a redox reaction, and in particular the present disclosure is directed to a zinc-air fuel cell which has an electrolyte and a zinc material at the same time to serve as reactant materials and is electrically connected to other external electronic products through the five electric connectors. The fuel cell may use a polysulfone resin to be packaged by an insert molding/injection molding method to diminish the leakage problem of the prior art. The five-electric-connectors structure may further facilitate the special use of performing two separate electrodes or single charging and charging and discharging at the same time.

The zinc-air fuel cell with five electric connectors of the present disclosure has the design of three positive electrodes and two negative electrodes so that a single cell itself may undergo a chemical reaction of charge and/or a chemical reaction of discharge at the same time.

Figure 6:
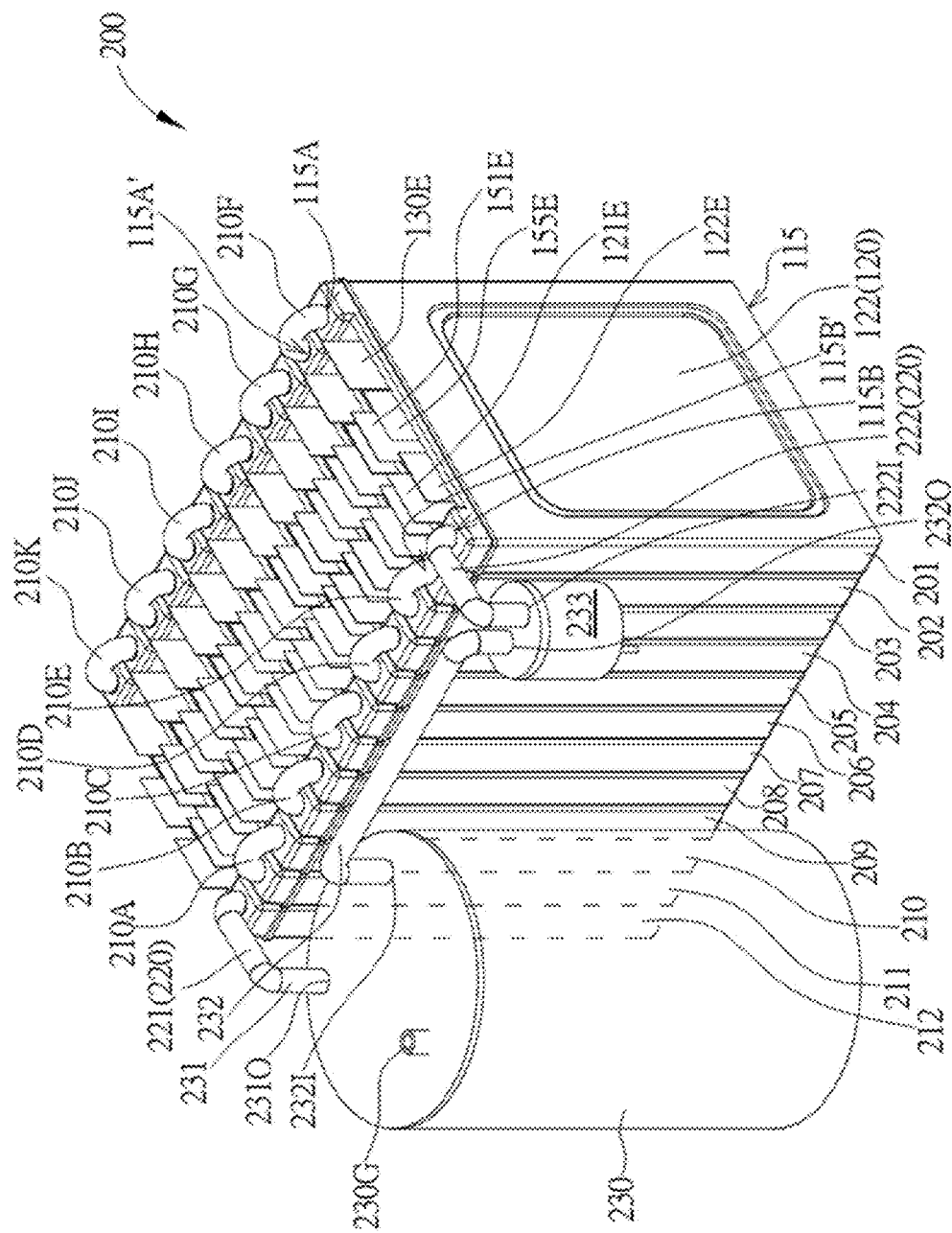
FIG. 6 illustrates a schematic diagram of a perspective view of an embodiment of a cell assembly composed of multiple cell structures which correspond to multiple zinc-air fuel cells with five electric connectors of the present disclosure.
Figure 6A:
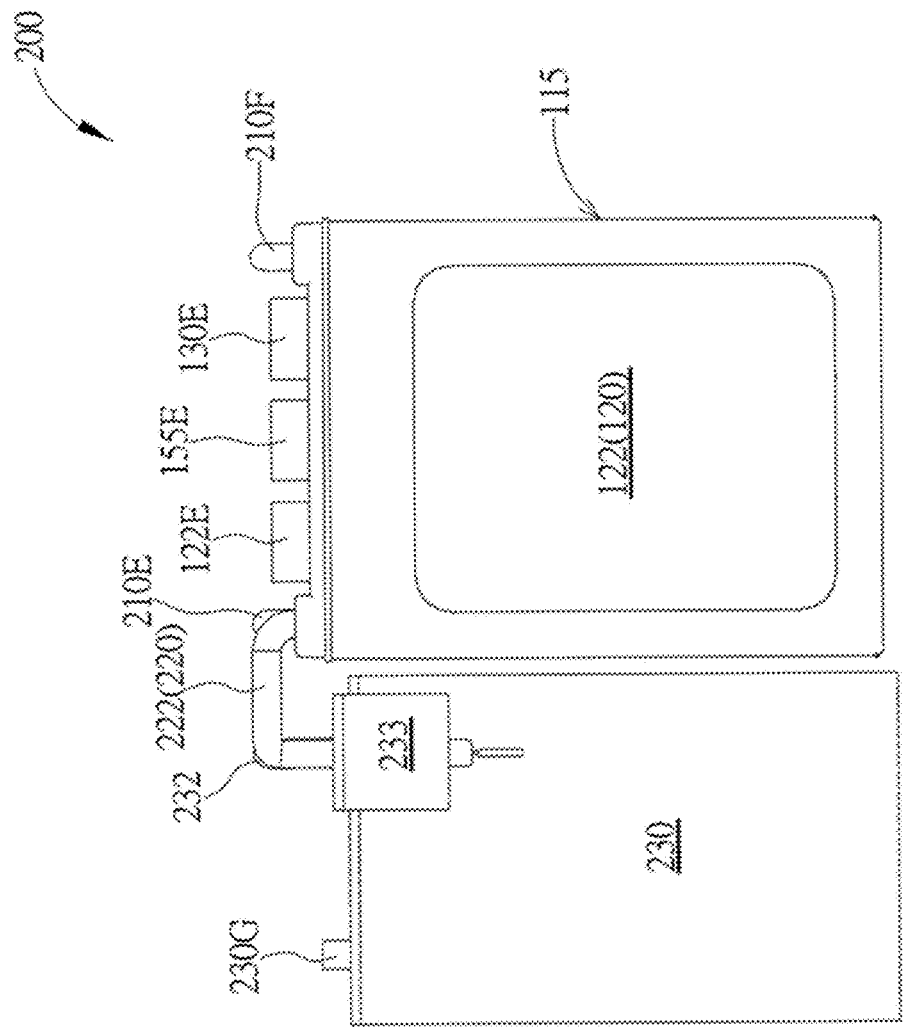
FIG. 6A illustrates a schematic diagram of a side view corresponding to FIG. 6 of the present disclosure.
Figure 6B:
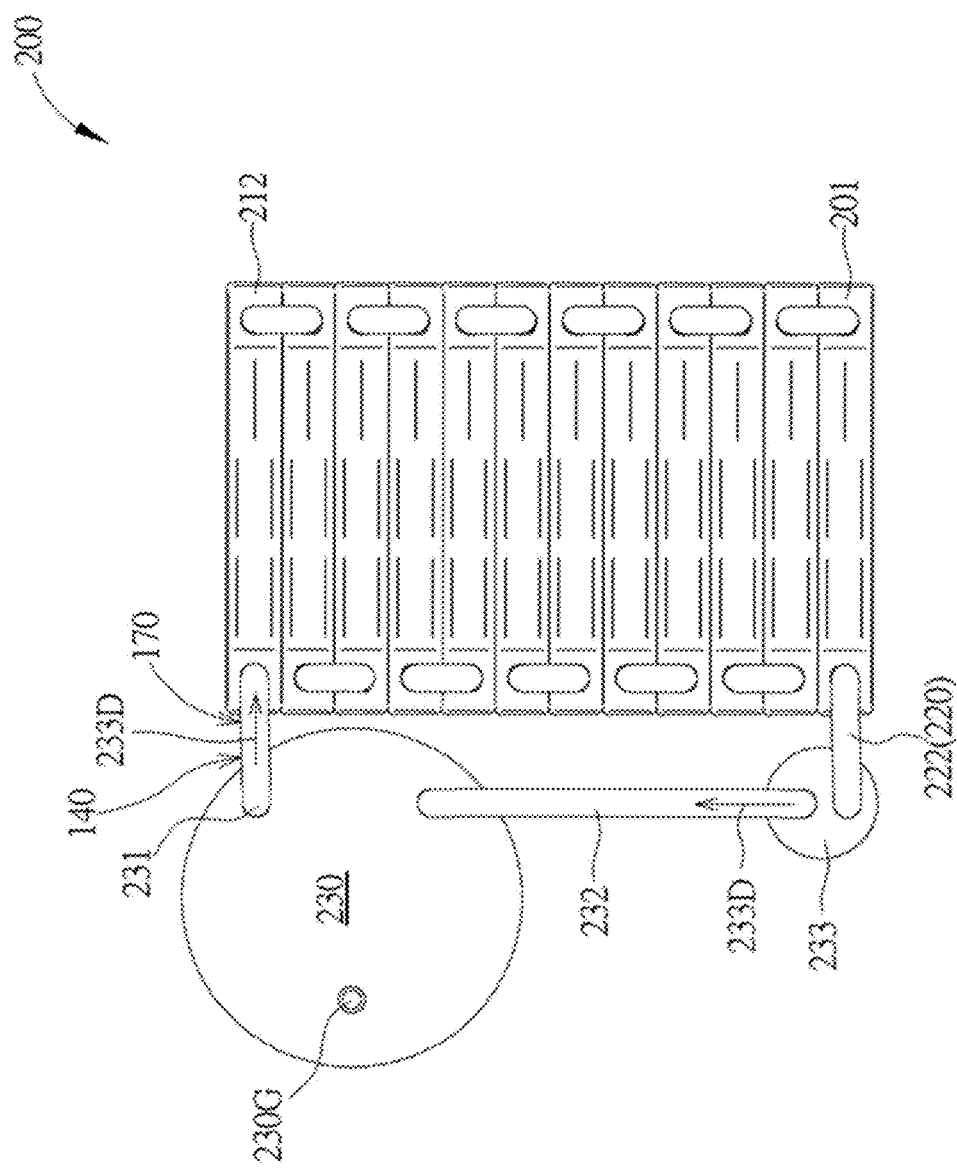
FIG. 6B illustrates a schematic diagram of a top view corresponding to FIG. 6 of the present disclosure.

FIG. 6 illustrates a schematic diagram of a perspective view of an embodiment of a cell assembly composed of multiple cell structures which correspond to multiple zinc-air fuel cells with five electric connectors of the present disclosure. FIG. 6A illustrates a schematic diagram of a side view corresponding to FIG. 6 of the present disclosure. FIG. 6B illustrates a schematic diagram of a top view corresponding to FIG. 6 of the present disclosure. A cell assembly may include two or more cell structures of the present disclosure. For example, the cell assembly 200 may include twelve cell structures, such as a cell structure 201, a cell structure 202, a cell structure 203, a cell structure 204, a cell structure 205, a cell structure 206, a cell structure 207, a cell structure 208, a cell structure 209, a cell structure 210, a cell structure 211, a cell structure 212, but the present disclosure is not limited to this. At least one cell structure in the cell assembly 200 may correspond to the zinc-air fuel cell with five electric connectors of the present disclosure.

One cell structure, taking the cell structure 201 for example, may include a case housing 115 to accommodate a first opening 115A, a second opening 115B, a right air electrode layer 122 of an air electrode set 120, a left discharging positive electric connector 121E, a right discharging positive electric connector 122E, a charging positive electric connector 130E, a left negative electric connector 151E and a right negative electric connector 155E, but the present disclosure is not limited to this. Similar numeral references in other cell structures are omitted for simplicity. Please refer to the above descriptions for the details of the cell structures.

The cell structures in the cell assembly 200 may be mutually connected. In some embodiments, one cell structure may be electrically connected to another cell structure in parallel. In some embodiments, one cell structure may be electrically connected to another cell structure in series. Further, the openings in adjacent cell structures may be mutually connected. The adjacent openings may be connected by connecting pipes. For example, two adjacent openings may be connected by a connecting pipe. FIG. 6 illustrates the cell assembly 200 may include a connecting pipe 210A, a connecting pipe 210B, a connecting pipe 210C, a connecting pipe 210D, a connecting pipe 210E, a connecting pipe 210F, a connecting pipe 210G, a connecting pipe 210H, a connecting pipe 210I, a connecting pipe 210J, and a connecting pipe 210K, but the present disclosure is not limited to these. For example, the second opening 115B of the cell structure 201 and the second opening 115B' of the cell structure 202 are connected by the connecting pipe 210E. Similarly, the first opening 115A of the cell structure 201 and the first opening 115A' of the cell structure 202 are connected by the connecting pipe 210F. Other adjacent openings in the cell structures may be connected in a similar way.

Further, the cell assembly 200 may include a circulation tube set 220 to allow a fluid to be distributed to at least one of the cell structures through the connecting pipes. The fluid may be selected form a group consisting of a gas, an electrolyte and a fuel. For example, the circulation tube set 220 may include a source circulation tube and a drain circulation tube. The source circulation tube may allow a fluid to enter the cell assembly 200 and the drain circulation tube may allow the fluid to leave the cell assembly 200.

FIG. 6 illustrates the cell assembly 200 may include a first circulation tube 221 and a second circulation tube 222. If the first circulation tube 221 is the source circulation tube, the second tube may be the corresponding drain circulation tube. Alternatively, if the first circulation tube 221 is the drain circulation tube, the second tube may be the corresponding source circulation tube. For example, if a fluid enters the cell structure 201 of the cell assembly 200 through the second circulation tube 222, the fluid may first pass through the first gas chamber (not shown), the second gas chamber (not shown), the left space (not shown) and the right space (not shown) of the cell structure 201, then enter the cell structure 202, the cell structure 203, the cell structure 204, the cell structure 205, the cell structure 206, the cell structure 207, the cell structure 208, the cell structure 209, the cell structure 210, the cell structure 211, and the first gas chamber (not shown), the second gas chamber (not shown), the left space (not shown) and the right space (not shown) of the cell structure 212, then leave the cell assembly 200 through the first circulation tube 221 of the cell structure 212, but the present disclosure is not limited to these.

Additionally, the cell assembly 200 may be equipped with one or more regulating devices to facilitate the regulation and/or circulation of the fluid in least one of the cell structures and/or between at least one of the cell structures through the connecting pipes. For example, the regulating device may include a fuel tank 230 and a circulating pump 233, but the present disclosure is not limited to this. The circulating pump 233 may serve as a transport device to facilitate the circulation of the fluid, or the regulation of the volume of the fluid to be distributed in the cell assembly 200, but the present disclosure is not limited to this. The fuel tank 230 may provide the cell assembly 200 with chemicals, for example the electrolyte, the zinc material and the combination thereof to buffer the chemical reactions.

In some embodiments, the cell structure 100 of the present disclosure may further include an optional transport device such as the circulating pump 233. The optional circulating pump 233 may help regulate the presence or the absence of the electrolyte 170 in the cell structure 100, or further assist to activate the predetermined chemical reaction or to deactivate the predetermined chemical reaction. In the absence of sufficient electrolyte 170 in the cell structure 100, the predetermined chemical reaction may be optionally ceased or significantly deactivated as much as possible to overcome the problems in the conventional cells or in the conventional batteries. The input or the output of a fluid which may be regulated by circulating pump 233 may change the height of the electrolyte 170 in at least one of the spaces, so that the electrolyte 170 may contact different elements in at least one of the spaces to accordingly change the status of the cell structure 100 of the present disclosure. This is one of the features of the cell structure 100 of the present disclosure.

The transport device may be connected to the spaces or to the gas chambers to regulate the entry or the departure of fluids, for example to regulate the entry or the departure of the gas and/or the electrolyte 170. Further, the transport device may regulate a height of the electrolyte 170 in the spaces. The height may enable the contact of the electrolyte 170 with the air electrode set 120 such as the left air electrode layer 121 or the right air electrode layer 122, with the metal layer 130 or with the zinc material 140 to determine the activation or the deactivation of the pre-determined chemical reaction. This approach may avoid the undesirable self-discharging or charging reaction of the zinc-air fuel cell with five electric connectors of the present disclosure when the cell structure 100 is in storage or not in use, and further avoid the corruption or surface peeling of the internal structure in the spaces so as to extend the storage life or the service life of the zinc-air fuel cell with five electric connectors of the present disclosure.

In some embodiments, the transport device may regulate the input of the electrolyte 170 into the left space 101 and into the right space 102 through the first gas chamber 103A and/or the second gas chamber 103B if the first gas chamber 103A, the second gas chamber 103B, the left space 101 and the right space 102 are mutually connected. For example, the transport device may provide the cell structure 100 with at least one of the zinc material 140 and the electrolyte 170 in a controlled condition to increase the volume of the electrolyte 170 in the cell structure 100, optionally may be up to the full level 170F (shown in FIG. 4). The increase of the volume of the electrolyte 170 results in the increase of the height of the electrolyte 170 in the left space 101 and in the right space 102.

In some embodiments, the transport device may regulate the output of at least one of the zinc material 140 and the electrolyte 170 from the left space 101 and the right space 102 through the first gas chamber 103A and/or the second gas chamber 103B if the first gas chamber 103A, the second gas chamber 103B, the left space 101 and the right space 102 are mutually connected. For example, the transport device may drain at least one of the zinc material 140 and the electrolyte 170 out of the cell structure 100 in a controlled condition to decrease the volume of at least one of the zinc material 140 and the electrolyte 170 in the cell structure 100. The decrease of the volume of the electrolyte 170 may result in the decrease of the height of the electrolyte 170 in the left space 101 and in the right space 102.

In some embodiments, the transport device may regulate the input of the gas into the left space 101 and into the right space 102 through the first gas chamber 103A and/or the second gas chamber 103B if the first gas chamber 103A, the second gas chamber 103B, the left space 101 and the right space 102 are mutually connected. The gas may include at least one of oxygen and air. For example, the transport device may provide the cell structure 100 with the gas in a controlled condition to facilitate the activation or the continuation of the pre-determined chemical reaction.

In some embodiments, the transport device may regulate the output of the gas from the left space 101 and from the right space 102 through the first gas chamber 103A and/or the second gas chamber 103B if the first gas chamber 103A, the second gas chamber 103B, the left space 101 and the right space 102 are mutually connected. The gas may include at least one of oxygen, air, oxygen-poor air and oxygen-depleted air. For example, the transport device may expel the gas from the cell structure 100 in a controlled condition to facilitate the continuation, the deactivation or the suppression of the pre-determined chemical reaction.

In some embodiments, the height of the electrolyte 170 may regulate the status of the cell structure 100 of the present disclosure. The status may include the activation of a charge reaction, the activation of a discharge reaction, the deactivation of the discharge reaction and the deactivation of a pre-determined chemical reaction.

For example, the cell structure 100 may be activated for a discharge reaction when the height of the electrolyte 170 enables the electrolyte 140 in contact with the air electrode set 120 such as the left air electrode layer 121 or the right air electrode layer 122, with the metal layer 130 and with the zinc material 140 simultaneously.

For example, the cell structure 100 may be activated for a charge reaction when the height of the electrolyte 170 enables the electrolyte 170 in contact with the air electrode set 120 such as the left air electrode layer 121 or the right air electrode layer 122, with the metal layer 130 and with the zinc material 140 simultaneously.

For example, the cell structure 100 may be activated for a discharge reaction when the height of the electrolyte 170 enables the electrolyte 170 in contact with the air electrode set 120 such as the left air electrode layer 121 or the right air electrode layer 122, and with the zinc material 140 simultaneously.

For example, the cell structure 100 may be activated for a charge reaction when the height of the electrolyte 170 makes the electrolyte 170 in contact with the metal layer 130 and with the zinc material 140 simultaneously.

For example, the cell structure 100 may be deactivated for a chemical reaction when the electrolyte 170 is in exclusive contact with only one of the air electrode set 120 such as the left air electrode layer 121 or the right air electrode layer 122, the metal layer 130 and the zinc material 140.

The present disclosure may enable the input or the output of at least one of the zinc material 140 and the electrolytic solution 170 through a transport device into or out of the zinc-air fuel cell with multiple electric connectors of the present disclosure so as to promote the replacement or the renewal operation process of the zinc material 140 or of the electrolytic solution 170 to double the efficiency of the operation process.

The zinc-air fuel cell with multiple electric connectors of the present disclosure may improve the reaction efficiency and charge and discharge performance of the fuel cell.

In some embodiments, the fuel tank 230 may have a gas hole 230G, a fuel outlet 2310, and a fuel inlet 2321. The gas hole 230G may facilitate to balance the gas pressure in the fuel tank 230. For example, excess gas in the fuel tank 230 may be discharged through the gas hole 230G. The fuel outlet 2310 may be connected to a fuel pipe 231 which is connected to the first circulation tube 221. The fuel inlet 2321 may be connected to another fuel pipe 232 which is connected to the circulating pump 233.

In some embodiments, the circulating pump 233 may have a fuel outlet 2320, and a fuel inlet 2221. The fuel outlet 2320 may be connected to the fuel pipe 232 which is connected to the fuel inlet 2321. The fuel inlet 2221 may be connected to the second circulation tube 222. The electrolyte and/or the zinc material may enter the first circulation tube 221 of the cell assembly 200 from the fuel outlet 2310 of the fuel tank 230 along the circulation direction 233D through the fuel pipe 231. The electrolyte and/or the zinc material may enter the fuel inlet 2221 of the circulating pump 233 from the second opening 115B of the cell assembly 200 along the circulation direction 233D through the second circulation tube 222. The electrolyte and/or the zinc material may return to the fuel inlet 2321 of the fuel tank 230 from the fuel outlet 2320 of the circulating pump 233 through the fuel pipe 232 to complete the overall circulation.

As mentioned above, the multiple electric connectors of the zinc-air fuel cell according to the present disclosure enables the fuel cell to perform the charging and discharging functions at the same time. That is, the zinc-air fuel cell according to the present disclosure is capable of sending, through the discharging function, the electrical energy stored in the fuel cell to a load that dissipates or otherwise consumes the electrical energy, while simultaneously being charged, through the charging function, by an external power source to restore or otherwise replenish the electrical energy stored in the fuel cell. The unique feature of performing both the charging and discharging functions at the same time makes the fuel cell according to the present disclosure a versatile and advantageous choice of power source in many practical applications over existing alternative technologies, which normally require a fuel cell to stop servicing a load before being charged and inevitably interrupt the service. For example, when the battery's electricity level is low and the battery does not support simultaneous charging and discharging, a transportation vehicle employing such a battery as its main power source, e.g., an electric moped or scooter, would need to interrupt its travel and stop by a charging station or a battery swapping station in order for the battery to be charged or swapped out. In contrast, the fuel cell according to the present disclosure would enable the electric moped to continue traveling while the fuel cell is being charged by an external power source, such as solar panels installed on the moped and electrically coupled to the fuel cell. In this way, the moped is able to attain a longer travel distance than otherwise without a need to interrupt its travel for battery charging or swapping.

Another advantageous example that may take advantage of the unique feature of the simultaneous charging/discharging function of the fuel cell of the present disclosure is flying drones. Flying drones have been adopted to an ever-wider range of applications including surveillance, delivery, agriculture, entertainment, etc., and a longer flight time of a flying drone (i.e., the time duration for which the drone is able to remain airborne) is almost always preferred in various applications. A tradeoff is obvious when a drone tries to extend the flight time by employing a high-capacity battery, as a high-capacity battery is inevitably heavier, which is unfavorable to having a long flight time. However, with the fuel cell of the present disclosure, external power sources can be used to charge the fuel cell while the fuel cell provides the power to the propellers of a flying drone. For example, the flying drone may be equipped with one or more electrical generators, e.g., wind turbine generators, that are able to generate electricity from winds or air currents flowing through the wind turbine generators while the drone is airborne. The electricity generated by the turbine generators can charge the fuel cell through a charging operation while the fuel cell drives, through a discharging operation, the propellers of the drone that make the drone fly. Various methods of simultaneous charging and discharging fuel cells of the present disclosure are detailed further below.

As shown in FIGS. 1, 2 and 3, the fuel cell 100(i.e., the cell structure 100) has five electric connectors, namely, 130E, 151E, 155E, 121E and 122E. The electric connector 130E is electrically coupled to the metal layer 130, which is the positive electrode of the fuel cell 100 as the fuel cell 100 performs the charging function. The electric connector 121E is electrically coupled to the left air electrode layer 121, whereas the electric connector 122E is electrically coupled to the right air electrode layer 122. Both the left air electrode layer 121 and the right air electrode layer 122 serve as the positive electrode of the fuel cell 100 as the fuel cell 100 performs the discharging function. Specifically, the left air electrode layer 121 serves as the positive electrode of the discharging operation when the fuel cell 100 discharges the electrolyte 170 within the left space 101, whereas the right air electrode layer 122 serves as the positive electrode of the discharging operation when the fuel cell 100 discharges the electrolyte 170 within the right space 102. Moreover, each of the electric connectors 151E and 155E is electrically coupled to the zinc material 140, which is the negative electrode of the fuel cell 100 as the fuel cell 100 performs either or both the charging function and the discharging function. Specifically, the electric connector 151E is electrically coupled to the zinc material 140 that is in contact with, or within a proximity of, the left conductive layer 151, which serves as the negative electrode when the fuel cell 100 discharges the electrolyte 170 within the left space 101. Similarly, the electric connector 155E is electrically coupled to the zinc material 140 that is in contact with, or within a proximity of, the right conductive layer 155, which serves as the negative electrode when the fuel cell 100 discharges the electrolyte 170 within the right space 102.

Figure 7:
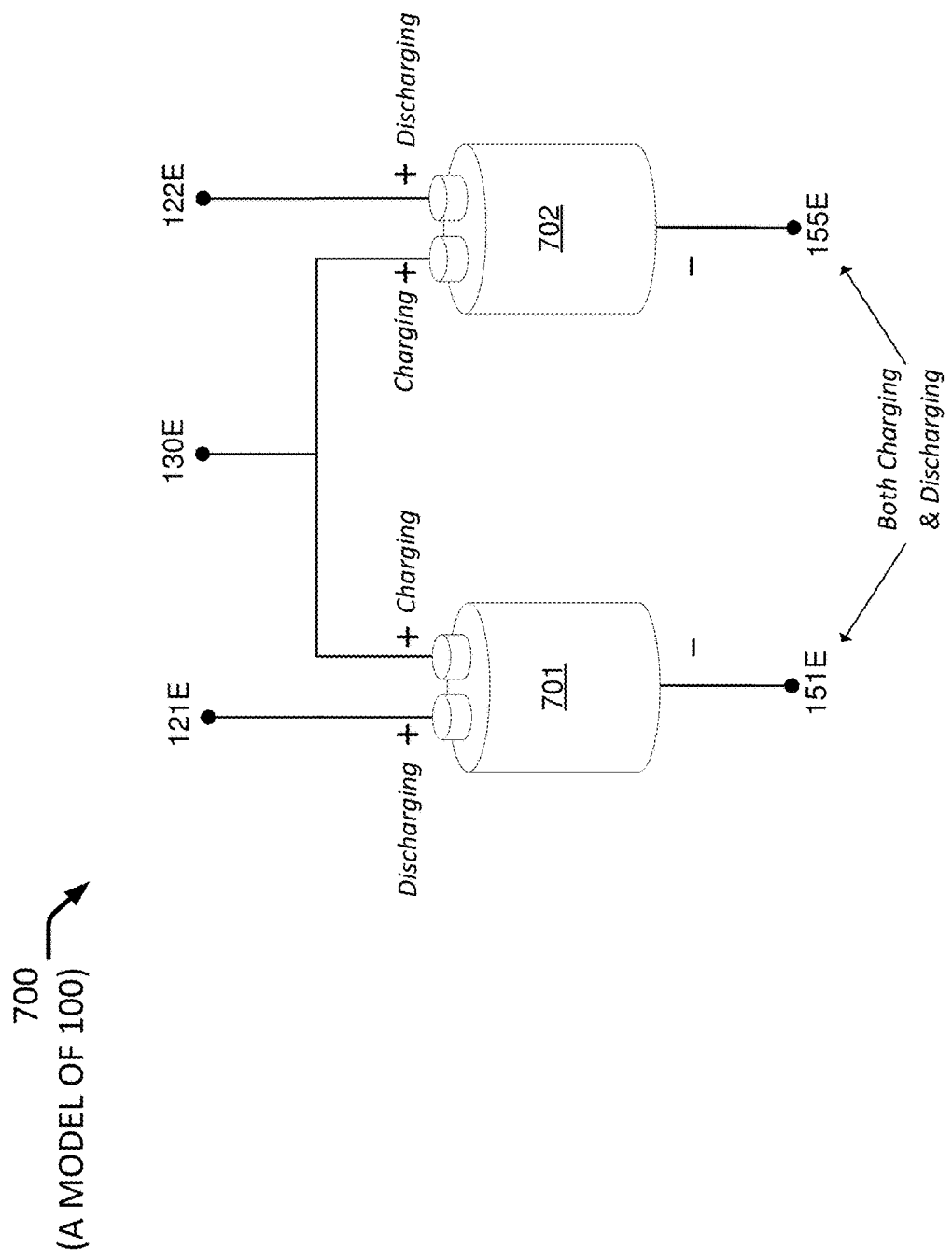
FIG. 7 illustrates a circuit model of the zinc-air fuel cell with five electric connectors of the present disclosure.

It follows that the fuel cell 100 may be modeled by, or conceptually viewed as, two electric batteries illustrated in FIG. 7, with each of the two batteries corresponding to electrochemical reactions happening within each of the left space 101 and the right space 102, respectively. Specifically, FIG. 7 illustrates a two-battery circuit model 700 of the fuel cell 100, with a battery 701 corresponding to electrochemical (i.e., charging and discharging) reactions happening within the left space 101, and a battery 702 corresponding to electrochemical reactions happening within the right space 102. Each of the batteries 701 and 702 has two distinctive positive nodes or terminals, one for the charging operation and the other for the discharging operation. The positive charging node of the battery 701 and the positive charging node of the battery 702 are coupled together to electrode 130E of the fuel cell 100, as the left space 101 and the right space 102 share a common metal layer, i.e., the metal layer 130. The positive discharging node of the battery 701 is coupled to the electrode 121E of the fuel cell 100, whereas the positive discharging node of the battery 702 is coupled to the electrode 122E of the fuel cell 100. Moreover, each of the batteries 701 and 702 has a negative node or terminal for both the charging and discharging functions of the respective battery. The negative node of the battery 701 is coupled to the electrode 151E of the fuel cell 100, whereas the negative node of the battery 702 is coupled to the electrode 155E of the fuel cell 100.

When the fuel cell 100 performs the charging function (i.e., the charging operation) and the discharging function (i.e., the discharging operation) at the same time, the fuel cell 100 can be placed in one of two different configurations. Specifically, the fuel cell 100 can be configured such that the batteries 701 and 702 are either in parallel connection or in serial connection when performing the discharging function, as explained below.

Figure 8A:
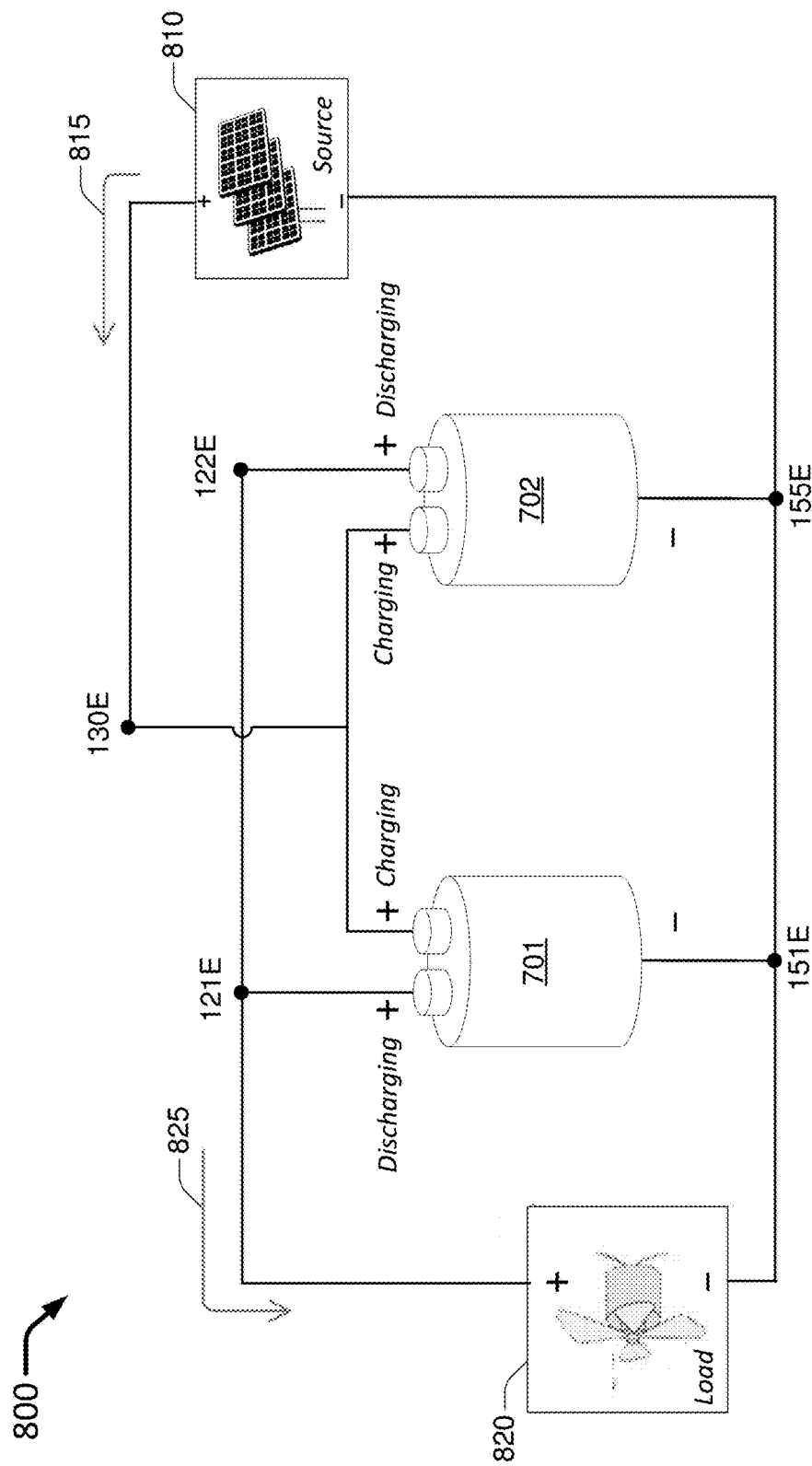
FIG. 8A illustrates a wiring configuration of the zinc-air fuel cell of the present disclosure that is modeled by the circuit model of FIG. 7, wherein a charging device and an electrical load are involved.

FIG. 8A illustrates a configuration 800 of the fuel cell 100 wherein the batteries 701 and 702 are connected in parallel as the fuel cell 100 simultaneously performs the discharging function and the charging function. Specifically, the fuel cell 100, when placed in the configuration 800, is driving an electrical load 820(e.g., an electric motor) through the discharging operation, while the fuel cell 100 is being charged via the charging operation at the same time, i.e., receiving electricity generated by an external power source 810(e.g., solar panels). As shown in FIG. 8A, the batteries 701 and 702 are connected in parallel as they drive the load 820 with an electric current 825 (i.e., the fuel cell 100 is performing the discharging function), because the electrodes 121E and 122E are electrically coupled at a same electric potential while the electrodes 151E and 155E are also electrically coupled at a same electric potential. Meanwhile, the batteries 701 and 702 are connected in parallel as they receive an electric current 815 from the external power source 810(i.e., the fuel cell 100 is performing the charging function). Since the batteries 701 and 702 are connected in parallel as they drive the load 820, the electric potential across the positive and negative terminals of the load 820 is substantially equal to the terminal voltage of the battery 701(i.e., the voltage difference between the electrodes 121E and 151E), as well as to the terminal voltage of the battery 702(i.e., the voltage difference between the electrodes 122E and 155E). For instance, each of the terminal voltage of the battery 701 and the terminal voltage of the battery 702 may be approximately 12 volts (V), which is also the voltage applied across the load 820 by the fuel cell 100.

Figure 8B:
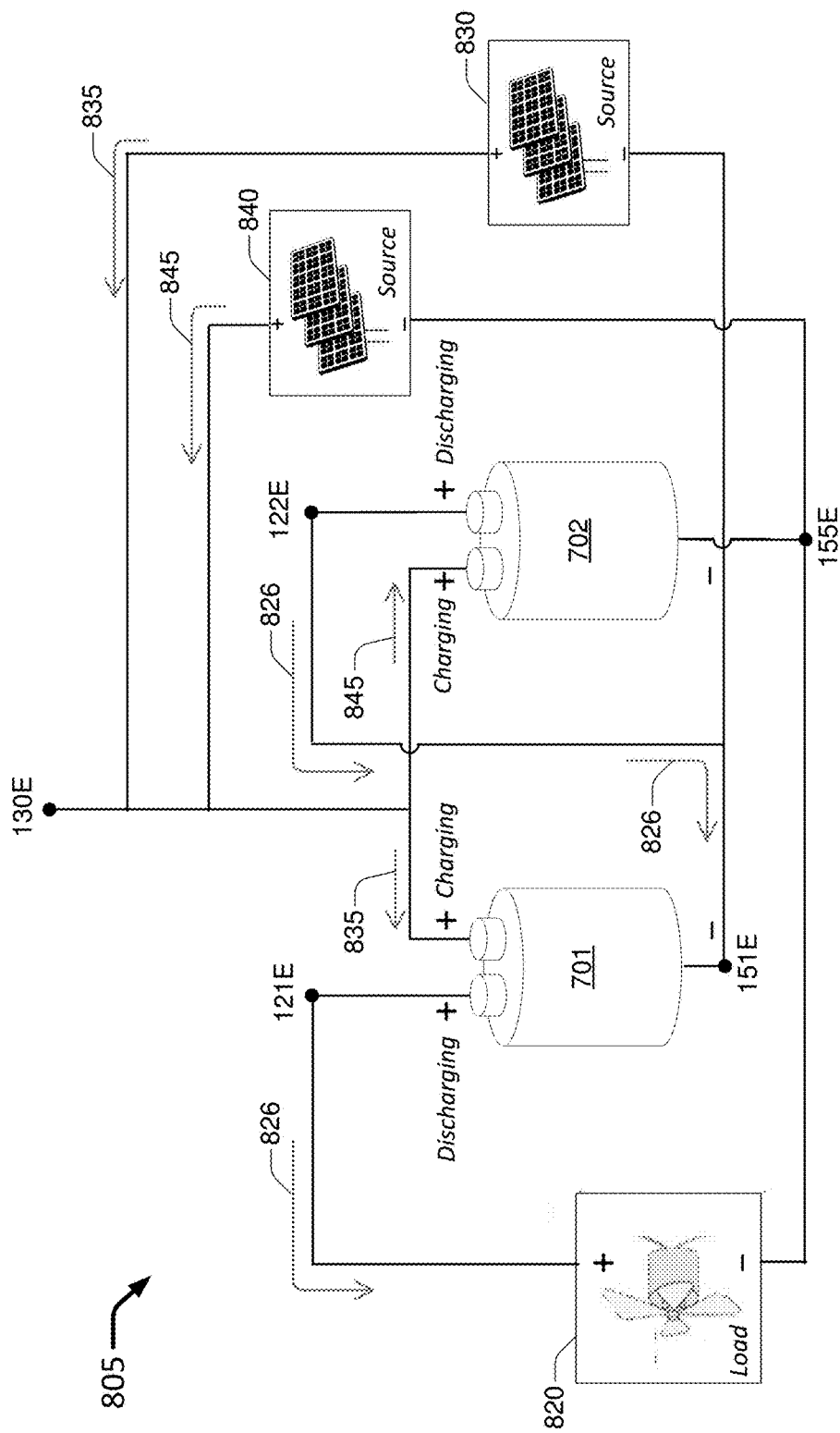
FIG. 8B illustrates another wiring configuration of the zinc-air fuel cell of the present disclosure that is modeled by the circuit model of FIG. 7, wherein two charging devices and an electrical load are involved.

FIG. 8B illustrates a configuration 805 of the fuel cell 100 wherein the batteries 701 and 702 are connected in series as the fuel cell 100 performs the discharging function, while the fuel cell 100 also simultaneously performs the charging function. Specifically, the fuel cell 100, when placed in the configuration 805, is driving an electrical load 820(e.g., an electric motor) through the discharging operation, while the fuel cell 100 is being charged via the charging operation at the same time, i.e., receiving electricity generated by external power sources 830 and 840(e.g., solar panels). As shown in FIG. 8B, batteries 701 and 702 are connected in series as they drive the load 820 with an electric current 826 (i.e., the fuel cell 100 is performing the discharging function), because the electrodes 151E and 122E are electrically coupled together at a same electric potential, while the electrodes 121E and 155E are electrically coupled to the positive and negative terminals of the load 820, respectively. Meanwhile, the batteries 701 and 702 are connected in a pseudo-parallel connection as the fuel cell 100 simultaneously performs the charging function. That is, while the batteries 701 and 702 have their respective positive charging terminals coupled together (i.e., the electrode 130E), their negative charging terminals (i.e., the electrode 151E and the electrode 155E) are not electrically coupled together. Specifically in the configuration 805, while the positive charging terminals of the batteries 701 and 702 are electrically coupled together, through the electrode 130E, to the positive terminals of both a first external power source (i.e., the external power source 830) and a second external power source (i.e., the external power source 840), the negative charging terminals of the batteries 701 and 702(i.e., the electrodes 151E and 155E) are not electrically coupled together. As shown in FIG. 8B, the electrode 151E is electrically coupled to the negative terminal of the external power source 830, whereas the electrode 155E is electrically coupled to the negative terminal of the external power source 840. Therefore, as the fuel cell 100 performs the charging operation, the battery 701 is charged by a current 835 generated by the external power source 830, whereas the battery 702 is charged by a current 845 generated by the external power source 840. Meanwhile, the fuel cell 100 performs the discharging operation by driving the load 820 with a current 826 that is generated by the batteries 701 and 702. As the batteries 701 and 702 are connected in series, the electric potential across the positive and negative terminals of the load 820 is substantially equal a sum of the terminal voltage of the battery 701(i.e., the voltage difference between the electrodes 121E and 151E) and the terminal voltage of the battery 702(i.e., the voltage difference between the electrodes 122E and 155E). For instance, each of the terminal voltage of the battery 701 and the terminal voltage of the battery 702 may be approximately 12 volts (V), and thus the voltage applied across the load 820 by the fuel cell 100 may be approximately 12V+12V=24V.

Figure 9:
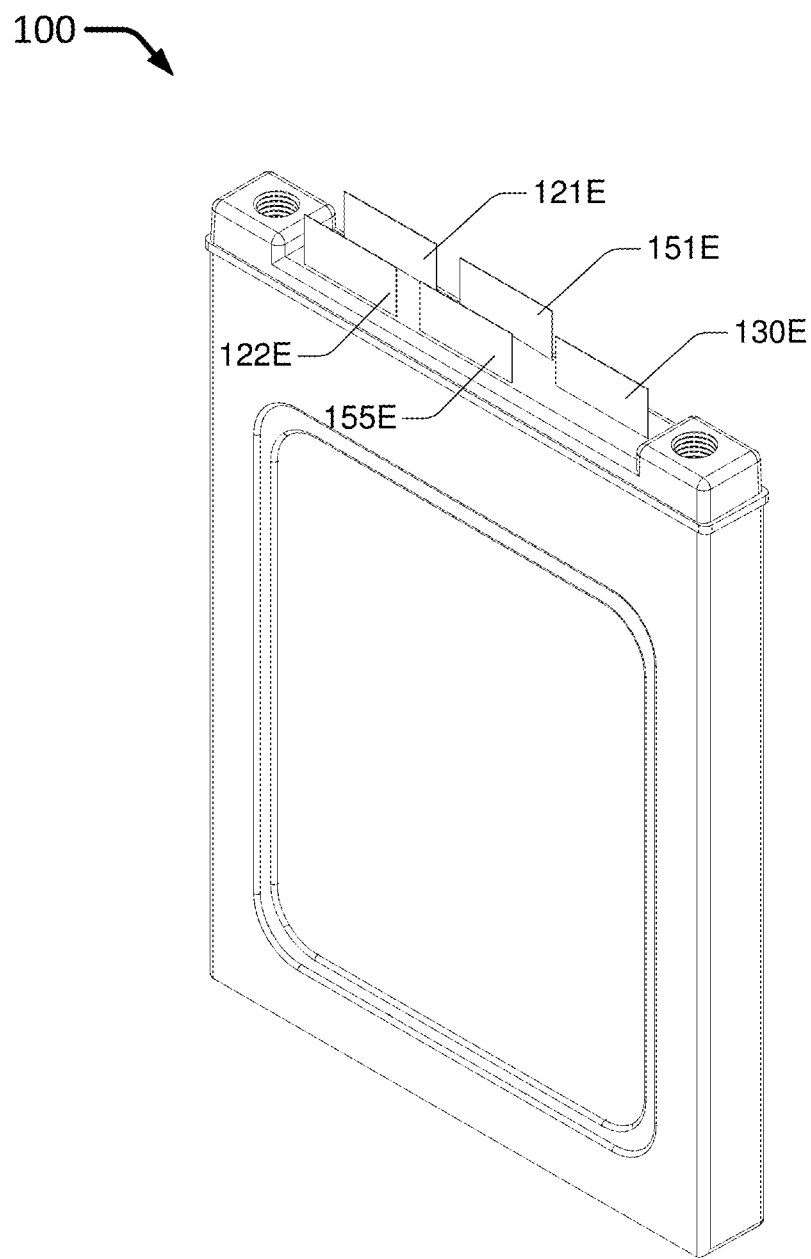
FIG. 9 illustrates a schematic diagram of a perspective view of an embodiment of the zinc-air fuel cell with five electric connectors of the present disclosure.

FIG. 9 illustrates a schematic diagram of a perspective view of the fuel cell 100. FIG. 9 is essentially identical to the perspective view of the fuel cell 100 shown in FIG. 3 only with a different orientation, that is, an upright orientation. The upright orientation of the fuel cell 100 is consistent with the orientation of the cell assembly 200 shown in FIG. 6, wherein a plurality of the fuel cells 100 may be employed to embody one, more, or all of the cell structures 201-212. It is worth noting that the upright position of the fuel cell 100 as shown in FIG. 6 allows the gas chambers 103A and 103B, shown in FIG. 4, to stay above the full level 170F of the electrolyte 170, so that the gas chambers 103A and 103B can function to adjust, guide or otherwise buffer the gas circulation and the electrolyte circulation inside the fuel cell 100 such that the internal pressure of the fuel cell 100 can be adjusted and balanced accordingly to facilitate the electrolyte circulation within each of the plurality of the fuel cells 100 of the cell assembly 200, as described elsewhere in the disclosure.

Figure 10A:
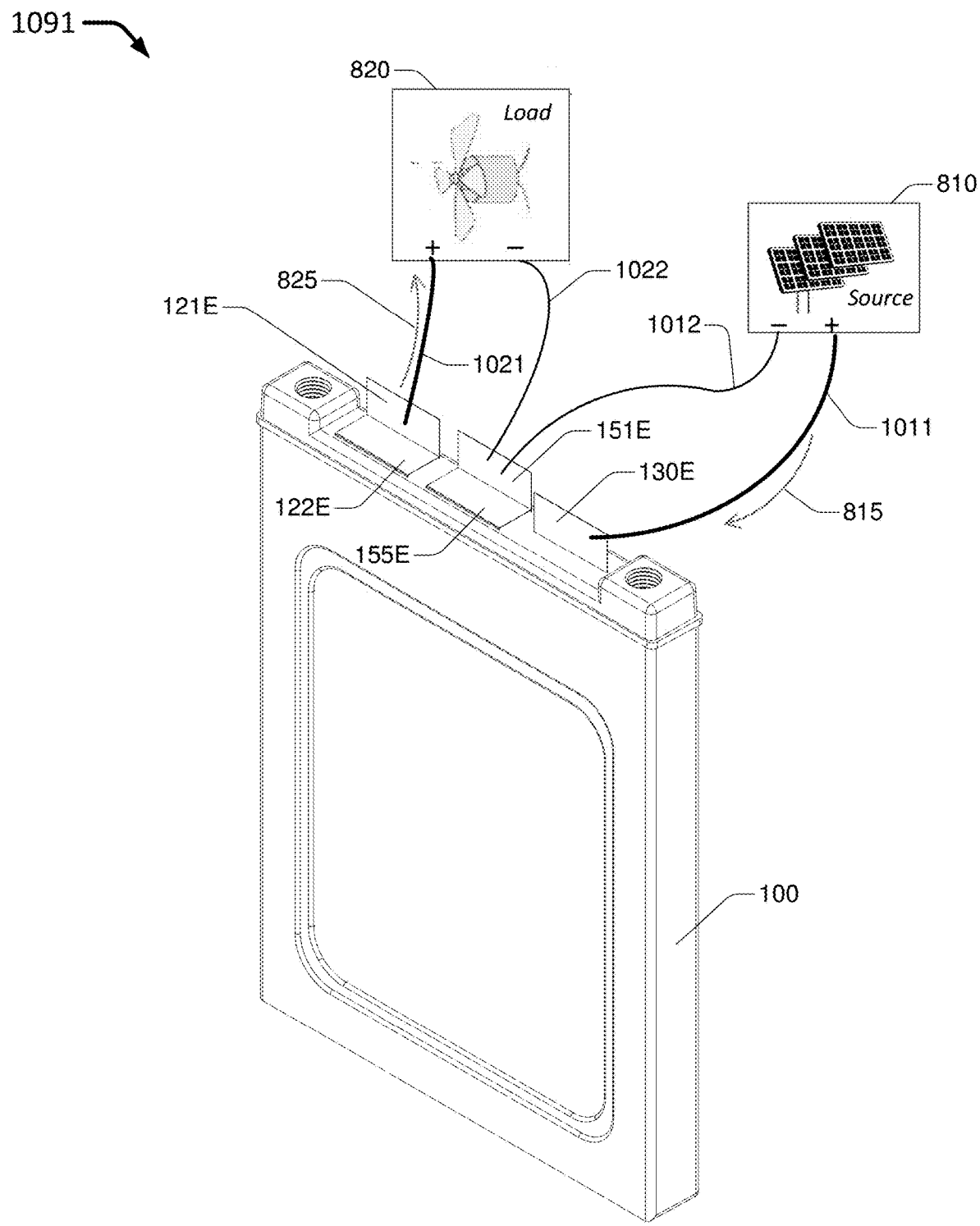
FIG. 10A illustrates a wiring configuration of the zinc-air fuel cell with five electric connectors of the present disclosure according to the configuration of FIG. 8A.

FIG. 10A illustrates a schematic diagram of a wiring configuration 1091 that shows how the fuel cell 100 may be wired or otherwise electrically coupled with one or more charging devices as well as one or more electrical loads to realize the configuration 800 of FIG. 8A, wherein the batteries 701 and 702 are configured in a parallel connection for both the charging operation and the discharging operation of the fuel cell 100. Compared with the perspective view of the fuel cell 100 in FIG. 3, the electrode 122E shown in FIG. 10A is folded toward the electrode 121E by approximately 90 degrees so that the electrode 122E is shorted with the electrode 121E. Similarly, the electrode 155E is folded toward the electrode 151E by approximately 90 degrees so that the electrode 155E is shorted with the electrode 151E. Additionally, the external power source 810 is electrically coupled to the fuel cell 100 via a pair of wires 1011 and 1012, whereas the load 820 is electrically coupled to the fuel cell 100 via a pair of wires 1021 and 1022. Specifically, the wire 1011 couples the positive terminal of the external power source 810 to the electrode 130E of the fuel cell 100, whereas the wire 1012 couples the negative terminal of the external power source 810 to the electrode 151E(and thus also electrically to the electrode 155E) of the fuel cell 100. Also, the wire 1021 couples the positive terminal of the load 820 to the electrode 121E(and thus also electrically to the electrode 122E) of the fuel cell 100, whereas the wire 1022 couples the negative terminal of the load 820 to the electrode 151E(and thus also electrically to the electrode 155E) of the fuel cell 100.

The shorting of the electrodes 121E and 122E, as well as the shoring of the electrodes 151E and 155E, are required to place the fuel cell 100 in the configuration 800. Instead of folding down electrodes 122E and 155E to respectively short with the electrodes 121E and 151E, other shoring mechanisms may be employed. For example, the electrodes 121E and 122E may be shorted by an electrical conductor such as a wire, and the electrodes 151E and 155E may also be shorted likewise. As another example, a metal (e.g., nickel) or other electrically conductive sheet may be made into an L-shaped piece and used as a common electrode to replace the electrodes 121E and 122E, thereby shorting the left air electrode layer 121 and the right air electrode layer 122 of the fuel cell 100. Likewise, an L-shaped sheet metal piece or conductor may be used as a common electrode to replace the electrodes 151E and 155E, thereby shorting the left conductive layer 151 and the right conductive layer 155 of the fuel cell 100.

Figure 10B:
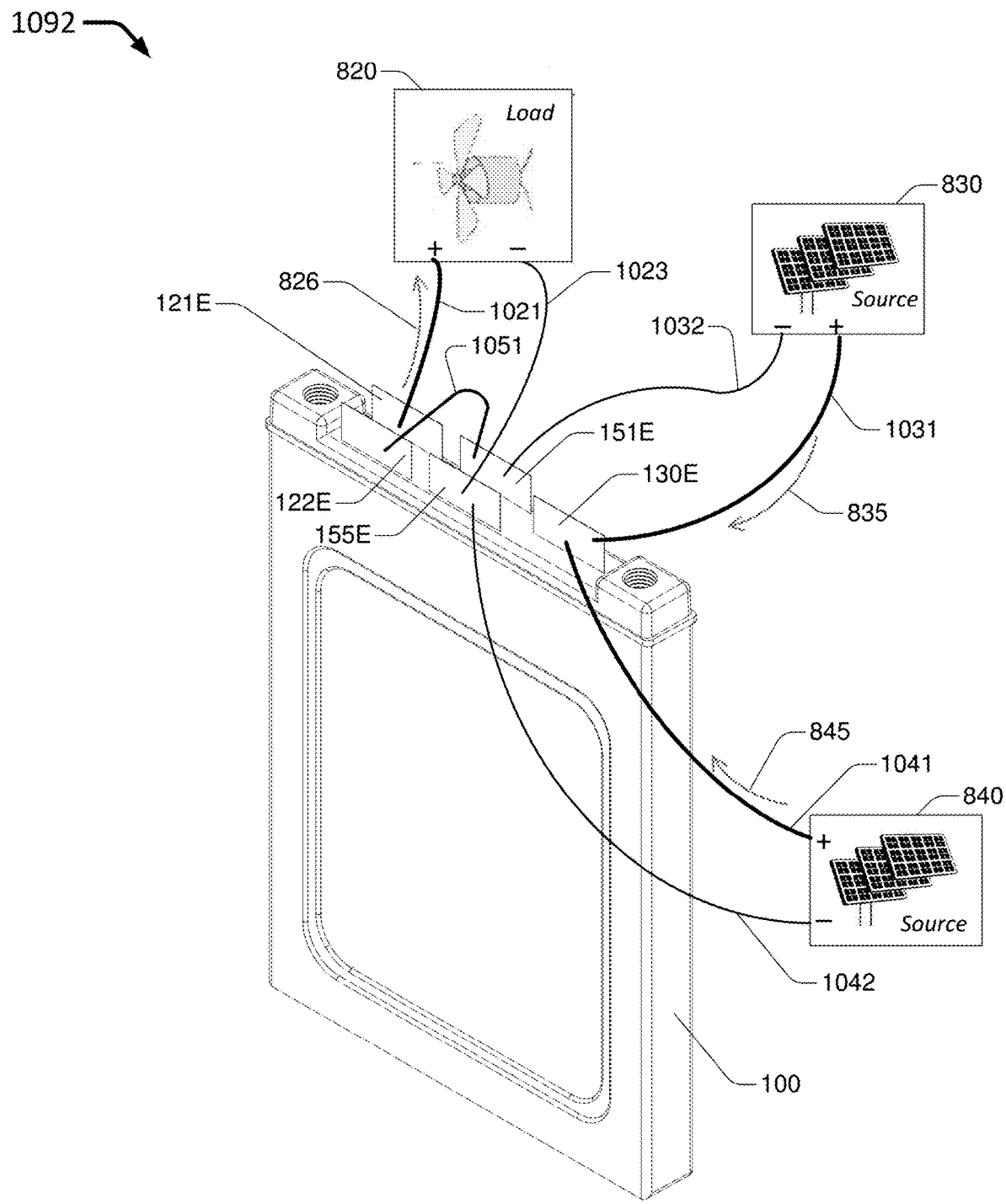
FIG. 10B illustrates a wiring configuration of the zinc-air fuel cell with five electric connectors of the present disclosure according to the configuration of FIG. 8B.

FIG. 10B illustrates a schematic diagram of a wiring configuration 1092 that shows how the fuel cell 100 may be wired or otherwise electrically coupled with one or more charging devices as well as one or more electrical loads to realize the configuration 805 of FIG. 8B, wherein the batteries 701 and 702 are configured in a serial connection for the discharging operation of the fuel cell 100, and in a pseudo-parallel connection for the charging operation of the fuel cell 100. As shown in FIG. 10B, a wire 1051 is used to electrically couple the electrode 151E with the electrode 122E. The external power source 830 is electrically coupled to the fuel cell 100 via a pair of wires 1031 and 1032, whereas the external power source 840 is electrically coupled to the fuel cell 100 via a pair of wires 1041 and 1042. Specifically, the wire 1031 couples the positive terminal of the external power source 830 to the electrode 130E of the fuel cell 100, whereas the wire 1032 couples the negative terminal of the external power source 830 to the electrode 151E of the fuel cell 100. Likewise, the wire 1041 couples the positive terminal of the external power source 840 to the electrode 130E of the fuel cell 100, whereas the wire 1042 couples the negative terminal of the external power source 840 to the electrode 155E of the fuel cell 100. Besides, the load 820 is electrically coupled to the fuel cell 100 via a pair of wires 1021 and 1023. Specifically, the wire 1021 couples the positive terminal of the load 820 to the electrode 121E of the fuel cell 100, whereas the wire 1023 couples the negative terminal of the load 820 to the electrode 155E of the fuel cell 100.

Figure 10C:
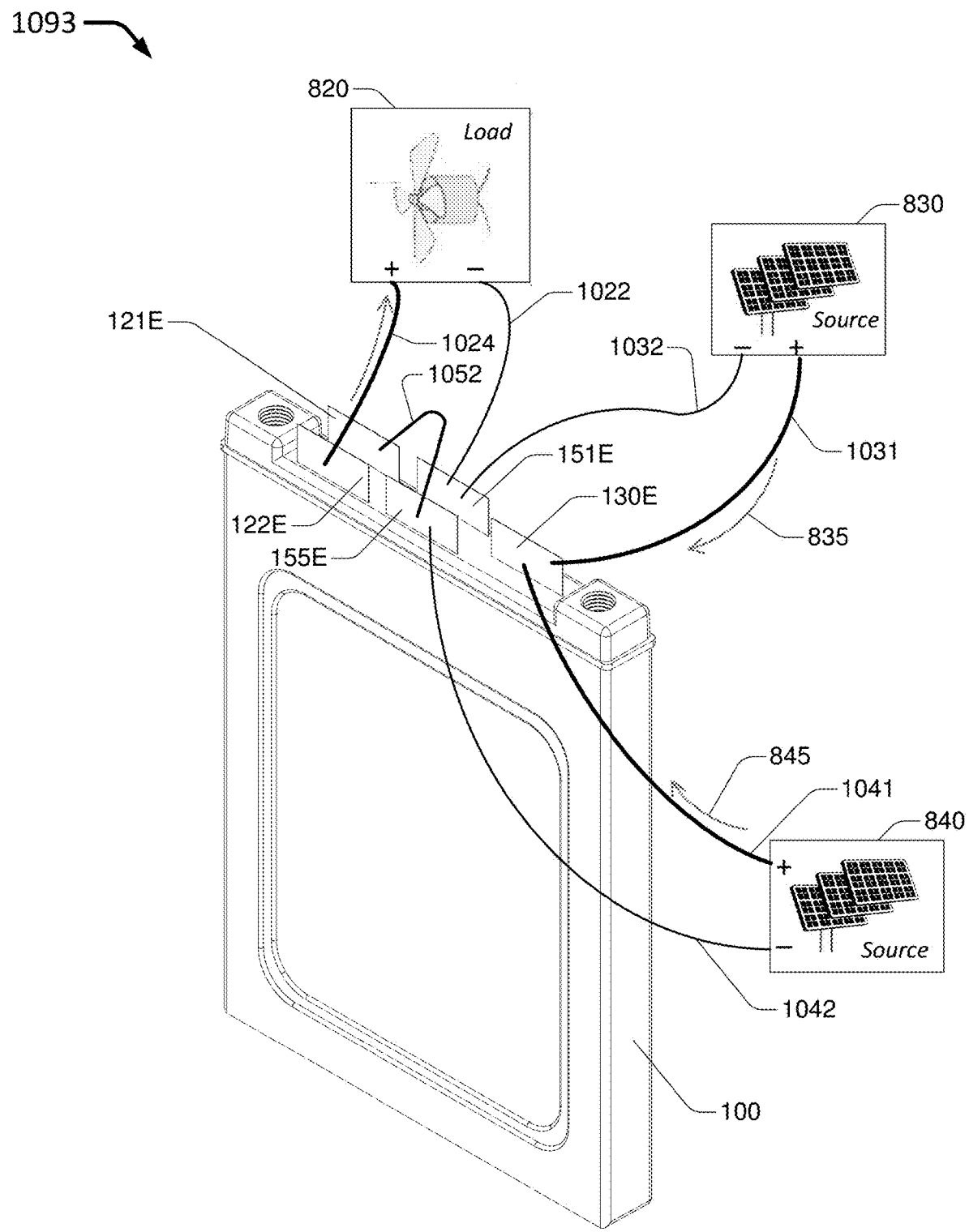
FIG. 10C illustrates another wiring configuration of the zinc-air fuel cell with five electric connectors of the present disclosure according to the configuration of FIG. 8B.

An equivalent configuration to the one shown in FIG. 8B and FIG. 10B is easily obtained by swapping the batteries 701 and 702 in the configuration. The equivalent configuration is shown in FIG. 10C as a wiring configuration 1093, wherein the batteries 701 and 702 are configured in a serial connection for the discharging operation of the fuel cell 100, and in a pseudo-parallel connection for the charging operation of the fuel cell 100. As shown in FIG. 10C, a wire 1052 is used to electrically couple the electrode 121E with the electrode 155E. The connections between the fuel cell 100 and the external power sources 830 and 840 remain the same as those in FIG. 10B. The load 820 is electrically coupled to the fuel cell 100 via a pair of wires 1024 and 1022. Specifically, the wire 1024 couples the positive terminal of the load 820 to the electrode 122E of the fuel cell 100, whereas the wire 1022 couples the negative terminal of the load 820 to the electrode 151E of the fuel cell 100.

Figure 11:
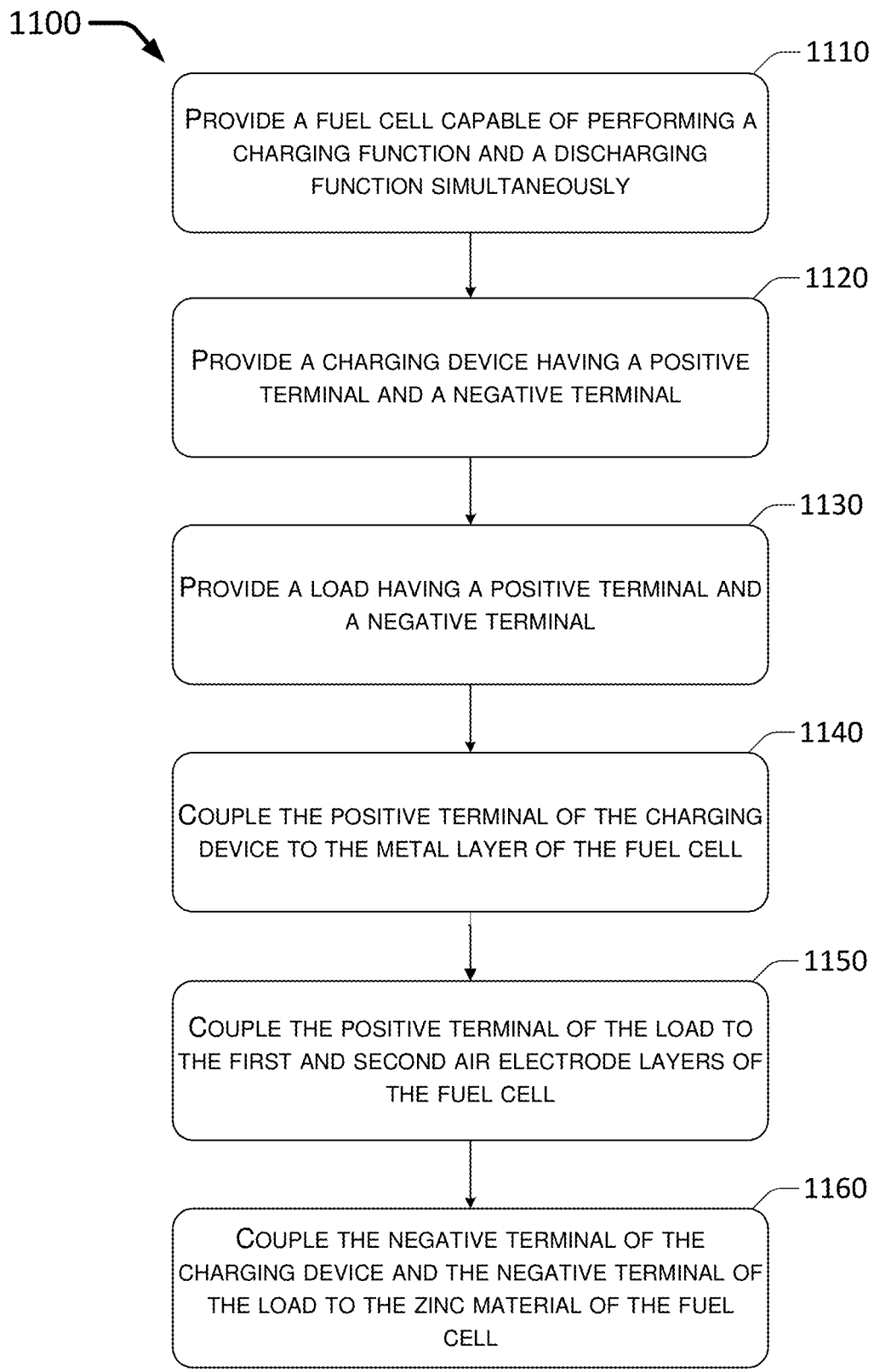
FIG. 11 illustrates a flow diagram of an example process for simultaneously charging and discharging a fuel cell.

FIG. 11 illustrates a flow diagram of an example process 1100 for simultaneously performing a charging function and a discharging function with a fuel cell. Process 1100 may be employed by the fuel cell 100 to realize the charging-discharging configuration 800 of FIG. 8A, wherein the fuel cell 100 is sending the electric current 825 to the load 820 by performing the discharging function while simultaneously receiving the electric current 815 from the external power source 810 by performing the charging function. Process 1100 may wire the fuel cell 100 with one or more charging devices as well as one or more electrical loads, such as how the fuel cell 100 is wired as shown in FIG. 10A. Process 1100 may include blocks 1110, 1120, 1130, 1140, 1150 and 1160. Process 1100 may begin at block 1110.

At block 1110, the process 1100 involves providing a fuel cell that is capable of performing a charging function and a discharging function simultaneously. For example, the fuel cell 100 may be provided at block 1110. The fuel cell may include a case that forms a space internal to the fuel cell, as well as a plurality of gas chambers (e.g., the gas chambers 103A and 103B) that are disposed in the space. The fuel cell may further include a first air electrode layer and a second air electrode layer (e.g., the left air electrode layer 121 and the right air electrode layer 122) that are disposed in the space. Each of the first and second air electrode layers may serve as a positive electrode for the discharging function of the fuel cell. The fuel cell may also include a metal layer (e.g., the metal layer 130) disposed in the space. The metal layer may serve as a positive electrode for the charging function of the fuel cell. The fuel cell may also include a zinc material (e.g., the zinc material 140) disposed in the space. The zinc material may serve as a negative electrode for both the charging function and the discharging function of the fuel cell. In some embodiments, the fuel cell may further include a first conductive layer and a second conductive layer (e.g., the left conductive layer 151 and the right conductive layer 155) that are respectively arranged on two opposite sides of the metal layer 130, wherein the zinc material is disposed at a central recessed region (e.g., the left recess 154 or the right recess 158) of each of the first and second conductive layers. The fuel cell may also include a plurality of separators (e.g., separators 161, 162, 163 and 164) disposed in the space. The plurality of separators are respectively disposed between the air electrode layers, the zinc material and the metal layer so that the first and second air electrode layers, the first and second conductive layers and the metal layer are separately arranged. Finally, the fuel cell may also include an electrolyte (e.g., the electrolyte 170) disposed in the space. The electrolyte is capable of flowing to pass through the separators and in contact with the first and second air electrode layers, with the metal layer and with the zinc material so that the air electrode layers, the zinc material and the metal layer are respectively electrically connected. Moreover, the electrolyte is disposed in the space via at least one of the plurality of gas chambers that are configured to pass but not to hold the electrolyte. Also, the electrolyte is disposed in the space up to a level that is located lower than the plurality of gas chambers. Process 1100 may proceed from block 1110 to block 1120.

At block 1120, the process 1100 involves providing a charging device (e.g., the external power source 810), wherein the charging device has a positive terminal and a negative terminal. Process 1100 may proceed from block 1120 to block 1130.

At block 1130, the process 1100 involves providing an electrical load (e.g., the load 820), wherein the load has a positive terminal and a negative terminal. Process 1100 may proceed from block 1130 to block 1140.

At block 1140, the process 1100 involves electrically coupling the positive terminal of the charging device to the metal layer of the fuel cell. For example, as shown in the configuration 800, the positive terminal of the external power source 810 is electrically coupled to the electrode 130E, which is in turn electrically coupled to the metal layer 130 of the fuel cell 100. Process 1100 may proceed from block 1140 to block 1150.

At block 1150, the process 1100 involves electrically coupling the positive terminal of the load to each of the first and second air electrode layers of the fuel cell. For example, as shown in the configuration 800, the positive terminal of the load 820 is electrically coupled to the electrode 121E, which is in turn electrically coupled to the left air electrode layer 121. In addition, the positive terminal of the load 820 is also electrically coupled to the electrode 122E, which is in turn electrically coupled to the right air electrode layer 122. Process 1100 may proceed from block 1150 to block 1160.

At block 1160, the process 1100 involves electrically coupling the negative terminal of the charging device as well as the negative terminal of the load to the zinc material of the fuel cell. For example, as shown in the configuration 800, the negative terminal of the external power source 810 is electrically coupled to both the electrode 151E and the electrode 155E, which are in turn electrically coupled to zinc material 140 of the fuel cell 100 via the left conductive layer 151 and the right conductive layer 155, respectively. In addition, the negative terminal of the load 820 is also electrically coupled to both the electrode 151E and the electrode 155E.

Following the process 1100, the fuel cell is configured to perform the charging function and the discharging function at the same time according to the configuration 800 of FIG. 8A. Specifically, the fuel cell is configured to perform the charging function by receiving an electric current (e.g., the electric current 815) from the charging device. Simultaneously, the fuel cell performs the discharging function by sending an electric current (e.g., the electric current 825) to the load (e.g., the load 820 of FIG. 8A).

Figure 12:
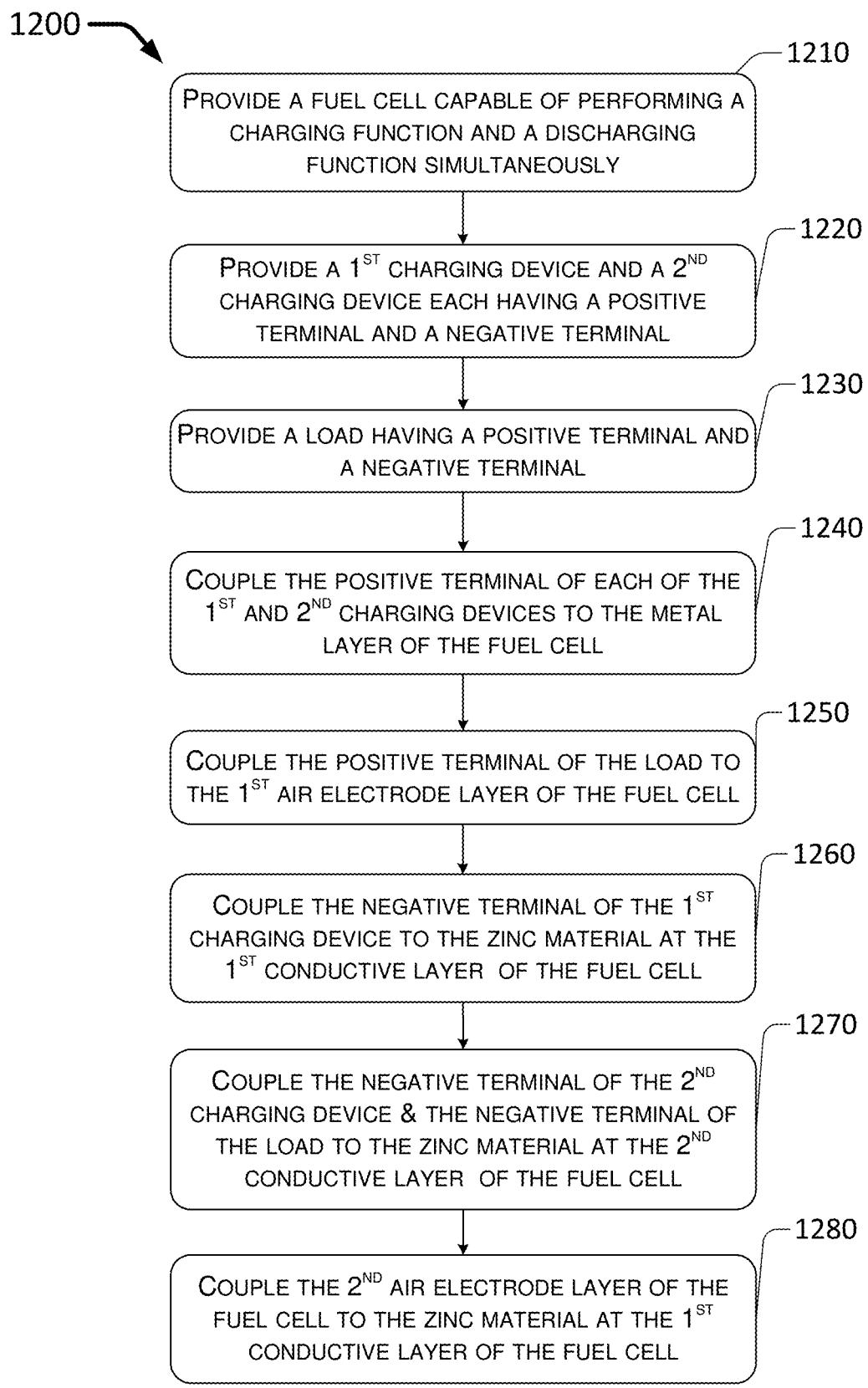
FIG. 12 illustrates a flow diagram of another example process for simultaneously charging and discharging a fuel cell.

FIG. 12 illustrates a flow diagram of an example process 1200 for simultaneously performing a charging function and a discharging function with a fuel cell. Process 1200 may be employed by the fuel cell 100 to realize the charging-discharging configuration 805 of FIG. 8B, wherein the fuel cell 100 is sending the electric current 826 to the load 820 by performing the discharging function while simultaneously receiving the electric currents 835 and 845 from the external power sources 830 and 840, respectively, by performing the charging function. Process 1200 may wire the fuel cell 100 with one or more of charging devices as well as one or more electrical loads, such as how the fuel cell 100 is wired as shown in FIG. 10B or FIG. 10C. Process 1200 may include blocks 1210, 1220, 1230, 1240, 1250, 1260, 1270 and 1280. Process 1200 may begin at block 1210.

At block 1210, the process 1200 involves providing a fuel cell that is capable of performing a charging function and a discharging function simultaneously. For example, the fuel cell 100 may be provided at block 1210. The fuel cell may include a case that forms a space internal to the fuel cell, as well as a plurality of gas chambers (e.g., the gas chambers 103A and 103B) that are disposed in the space. The fuel cell may also include a metal layer (e.g., the metal layer 130) disposed in the space. The metal layer may serve as a positive electrode for the charging function of the fuel cell. The fuel cell may further include a first air electrode layer and a second air electrode layer (e.g., the left air electrode layer 121 and the right air electrode layer 122) that are disposed in the space and on two opposite sides of the metal layer. Each of the first and second air electrode layers may serve as a positive electrode for the discharging function of the fuel cell. The fuel cell may also include a zinc material (e.g., the zinc material 140) disposed in the space. The zinc material may serve as a negative electrode for both the charging function and the discharging function of the fuel cell. In some embodiments, the fuel cell may further include a first conductive layer and a second conductive layer (e.g., the left conductive layer 151 and the right conductive layer 155) that are respectively arranged on two opposite sides of the metal layer 130, wherein the zinc material is disposed at a central recessed region (e.g., the left recess 154 or the right recess 158) of each of the first and second conductive layers. Specifically, the first conductive layer may be disposed between the metal layer and the first air electrode layer, whereas the second conductive layer may be disposed between the metal layer and the second air electrode layer. The fuel cell may also include a plurality of separators (e.g., separators 161, 162, 163 and 164) disposed in the space. The plurality of separators are respectively disposed between the air electrode layers, the first and second conductive layers and the metal layer so that the first and second air electrode layers, the first and second conductive layers and the metal layer are separately arranged. Finally, the fuel cell may also include an electrolyte (e.g., the electrolyte 170) disposed in the space. The electrolyte is capable of flowing to pass through the separators and in contact with the first and second air electrode layers, with the metal layer and with the zinc material so that the air electrode layers, the zinc material and the metal layer are respectively electrically connected. Moreover, the electrolyte is disposed in the space via at least one of the plurality of gas chambers that are configured to pass but not to hold the electrolyte. Also, the electrolyte is disposed in the space up to a level that is located lower than the plurality of gas chambers. Process 1200 may proceed from block 1210 to block 1220.

At block 1220, the process 1200 involves providing a first charging device (e.g., the external power source 830) and a second charging device (e.g., the external power source 840), wherein each of the first and second charging devices has a positive terminal and a negative terminal. Process 1200 may proceed from block 1220 to block 1230.

At block 1230, the process 1200 involves providing a load (e.g., the load 820), wherein the load has a positive terminal and a negative terminal. Process 1200 may proceed from block 1230 to block 1240.

At block 1240, the process 1200 involves electrically coupling the positive terminal of each of the first and second charging devices to the metal layer of the fuel cell. For example, as shown in the configuration 805, the positive terminal of the external power source 830, as well as the positive terminal of the external power source 840, are both electrically coupled to the electrode 130E, which is in turn electrically coupled to the metal layer 130 of the fuel cell 100. Process 1200 may proceed from block 1240 to block 1250.

At block 1250, the process 1200 involves electrically coupling the positive terminal of the load to the first air electrode layer of the fuel cell. For example, as shown in the configuration 805, the positive terminal of the load 820 is electrically coupled to the electrode 121E, which is in turn electrically coupled to the left air electrode layer 121. Process 1200 may proceed from block 1250 to block 1260.

At block 1260, the process 1200 involves electrically coupling the negative terminal of the first charging device to the zinc material disposed at the central recessed region of the first conductive layer of the fuel cell. For example, as shown in the configuration 805, the negative terminal of the external power source 830 is electrically coupled to the electrode 151E, which is in turn electrically coupled to the zinc material 140 disposed at the left recess 154 of the left conductive layer 151 of the fuel cell 100. Process 1200 may proceed from block 1260 to block 1270.

At block 1270, the process 1200 involves electrically coupling the negative terminal of the second charging device as well as the negative terminal of the load to the zinc material disposed at the central recessed region of the second conductive layer of the fuel cell. For example, as shown in the configuration 805, the negative terminal of the external power source 840 is electrically coupled to the electrode 155E, which are in turn electrically coupled to the zinc material 140 disposed at the right recess 158 of the right conductive layer 155 of the fuel cell 100. In addition, the negative terminal of the load 820 is also electrically coupled to the electrode 155E. Process 1200 may proceed from block 1270 to block 1280.

At block 1280, the process 1200 involves electrically coupling the second air electrode layer of the fuel cell to the zinc material disposed at the central recessed region of the first conductive layer of the fuel cell. For example, as shown in the configuration 805, the electrode 122E, which is electrically coupled to the right air electrode layer 122, is electrically coupled to the electrode 151E, which is electrically coupled to the zinc material 140 disposed at the left recess 154 of the left conductive layer 151 of the fuel cell 100.

Following the process 1200, the fuel cell is configured to perform the charging function and the discharging function at the same time according to the configuration 805 of FIG. 8B. Specifically, the fuel cell is configured to perform the charging function by receiving a first electric current (e.g., the electric current 835) from the first charging device (e.g., the external power source 830) and by receiving a second electric current (e.g., the electric current 845) from the second charging device (e.g., the external power source 840). Simultaneously, the fuel cell performs the discharging function by sending an electric current (e.g., the electric current 826) to the load (e.g., the load 820 of FIG. 8B).

Figure 13:
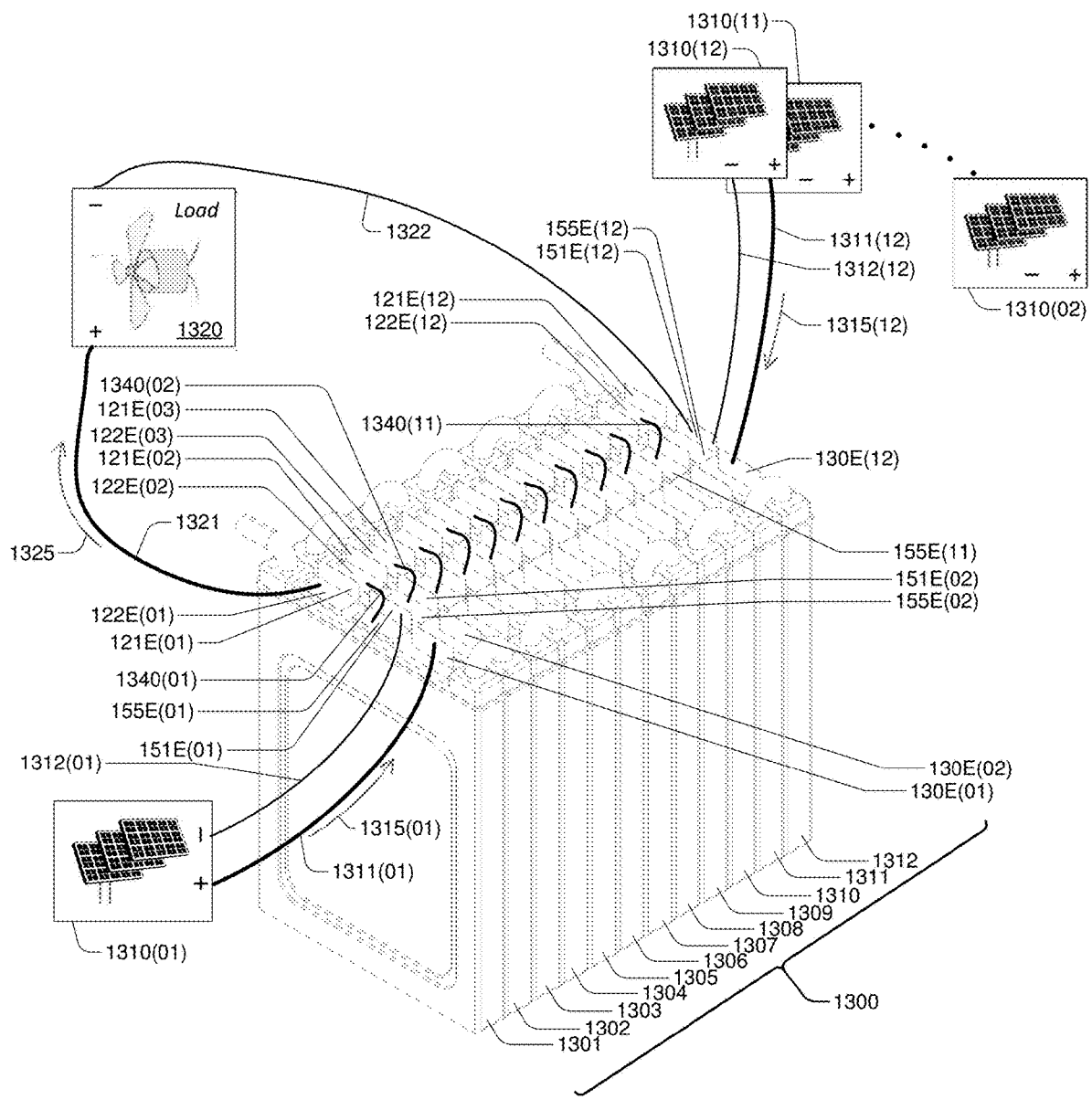
FIG. 13 illustrates a wiring configuration of a cell assembly consist of the zinc-air fuel cells wherein each is wired according to the configuration of FIG. 10A.

For some applications, two or more of the fuel cells described elsewhere herein may be combined as a cell assembly, similar to how the fuel cells 201-212 are combined or otherwise integrated in the cell assembly 200, wherein the two or more fuel cells of the cell assembly collectively perform a charging function and a discharging function simultaneously. FIG. 13 illustrates a charging-discharging wiring configuration which involves a cell assembly 1300, a plurality of charging devices 1310(01), 1310(02), . . . , 1310(11), 1310(12), and an electrical load 1320. The cell assembly 1300 includes twelve fuel cells 1301-1312 that are arranged in a stacking structure, as shown in FIG. 13. Each of the twelve fuel cells 1301-1312 may be realized by the fuel cell 100 configured in the charging-discharging configuration 800. Namely, each of the fuel cells 1301-1312 is wired according to the wiring configuration 1091 of FIG. 10A, except that in FIG. 13 the fuel cells 1301-1312 collectively charge one electrical load, i.e., the load 1320. As shown in FIG. 13, each of the fuel cells 1301-1312 has its electrode 122E folded towards the electrode 121E and thus shorted with the electrode 121E. Also, each of the fuel cells 1301-1312 has the respective electrode 155E shorted with the electrode 151E in a similar way. For example, the electrode 155E of the fuel cell 1301, labeled as 155E(01) in the figure, is shorted with the electrode 151E of the fuel cell 1301, labeled as 151E(01). Also, the electrode 122E of the fuel cell 1301, which is labeled as 122E(01), is shorted with the electrode 121E of the fuel cell 1301, which is labeled as 121E(01). Likewise, the electrode 155E of the fuel cell 1302, labeled as 155E(02), is shorted with the electrode 151E of the fuel cell 1302, labeled as 151E(02). The electrode 122E of the fuel cell 1302, labeled as 122E(02), is shorted with the electrode 121E of the fuel cell 1302, labeled as 121E(02). That is, the left conductive layer 151 of each of the fuel cells 1301-1312 is electrically coupled to the respective right conductive layer 155, whereas the left air electrode layer 121 of each of the fuel cells 1301-1312 is electrically coupled to the respective right air electrode layer 122.

Moreover, the cell assembly 1300 includes a plurality of wires that are employed to make a plurality of inter-cell connections, i.e., electrical connections between every adjacent two of the fuel cells 1301-1312. Specifically, for each of the fuel cells 1301-1311, the respective electrode 155E is electrically coupled to the electrode 122E of the following fuel cell in the stacking structure. For example, a wire 1340(01) is used to electrically couple the electrode 155E of the fuel cell 1301, labeled as 155E(01) in the figure, to the electrode 122E of the fuel cell 1302, labeled as 122E(02). Likewise, a wire 1340(02) is used to electrically couple the electrode 155E of the fuel cell 1302, labeled as 155E(02), to the electrode 122E of the fuel cell 1303, labeled as 122E(03). In this way, the inter-cell connections are carried out for every two adjacent fuel cells of the cell assembly 1300, the last inter-cell connection being made by a wire 1340(11) between the electrode 155E of the fuel cell 1311, labeled as 155E(11), and the electrode 122E of the fuel cell 1312, labeled as 122E(12). Accordingly, the cell assembly 1300 includes a total of eleven inter-cell connections across the fuel cells 1301-1312. That is, the total number of the inter-cell connection wires, i.e., wires 1340(01)-1340(11), is one (1) less than the total number of the fuel cells in the cell assembly 1300, i.e., fuel cells 1301-1312. The eleven inter-cell connections essentially place the fuel cells 1301-1312 in a serial connection with each other for the cell assembly 1300 to perform a discharging function.

The cell assembly 1300 performs a charging function by receiving charging currents from the plurality of charging devices 1310(01)-1310(12). Specifically, each of the fuel cells 1301-1312 is electrically coupled to a respective one of the charging devices 1310(01)-1310(12) through a pair of wires, same as how the fuel cell 100 is wired to the charging device 810 in the wiring configuration 1091 of FIG. 10A. For example, the fuel cell 1301 is electrically coupled to the charging device 1310(01) through a pair of wires 1311(01) and 1312(01), wherein the wire 1311(01) electrically couples the electrode 130E of the fuel cell 1301, which is labeled as 130E(01) in FIG. 13, to the positive terminal of the charging device 1310(01), and wherein the wire 1312(01) electrically couples the electrode 151E of the fuel cell 1301, labeled as 151E(01), to the negative terminal of the charging device 1310(01). The fuel cell 1301 thus receives a charging current 1315 (01) carried by the wire 1311(01) from the charging device 1310(01) to charge the fuel cell 1301 as part of the charging operation that the cell assembly 1300 performs. Likewise, the rest of the fuel cells 1301-1312 each receives a respective charging current from the charging device it is coupled to as part of the charging operation that the cell assembly 1300 performs, the last being the fuel cell 1312 which receives a charging current 1315 (12) from the charging device 1310(12) via the wire 1311(12).

Simultaneously while performing the charging function, the cell assembly 1300 also performs the discharging function at the same time. As mentioned above, the eleven inter-cell connections (e.g., the wires 1340(01), 1340(02), . . . , and 1340(11) in FIG. 13) essentially connect the fuel cells 1301-1312 in series for the cell assembly 1300 to perform the discharging function. For example, the cell assembly 1300 may perform the discharging function by sending an electric current 1325 to the electrical load 1320. As the fuel cells 1301-1312 are electrically connected in series while performing the discharging function, the electrical load 1320 is coupled to the cell assembly 1300 by a pair of wires 1321 and 1322, wherein the wire 1321 electrically couples the electrode 122E of the fuel cell 1301, labeled as 122E(01), to the positive terminal of the load 1320, and wherein the wire 1322 electrically couples the electrode 151E of the fuel cell 1312, labeled as 151E(12), to the negative terminal of the load 1320. Namely, the electrical load 1320 is electrically coupled between the air electrode layers of the first fuel cell of the stacking structure of the cell assembly 1300(i.e., the fuel cell 1301) and the conductive layers of the last fuel cell of the stacking structure of the cell assembly 1300 (i.e., the fuel cell 1312).

Accordingly, the cell assembly 1300 performs the charging function by receiving twelve charging currents 1315 (01)-1315 (12) from the charging devices 1310(01)-1310 (12), while simultaneously performing the discharging function by sending the electric current 1325 via the wire 1321 to drive the load 1320. It is worth noting that, while the fuel cells 1301-1312 are connected in series to perform the discharging function, each of the fuel cells 1301-1312 individually receives a charging current from the respective charging device it couples thereto.

Figure 14:
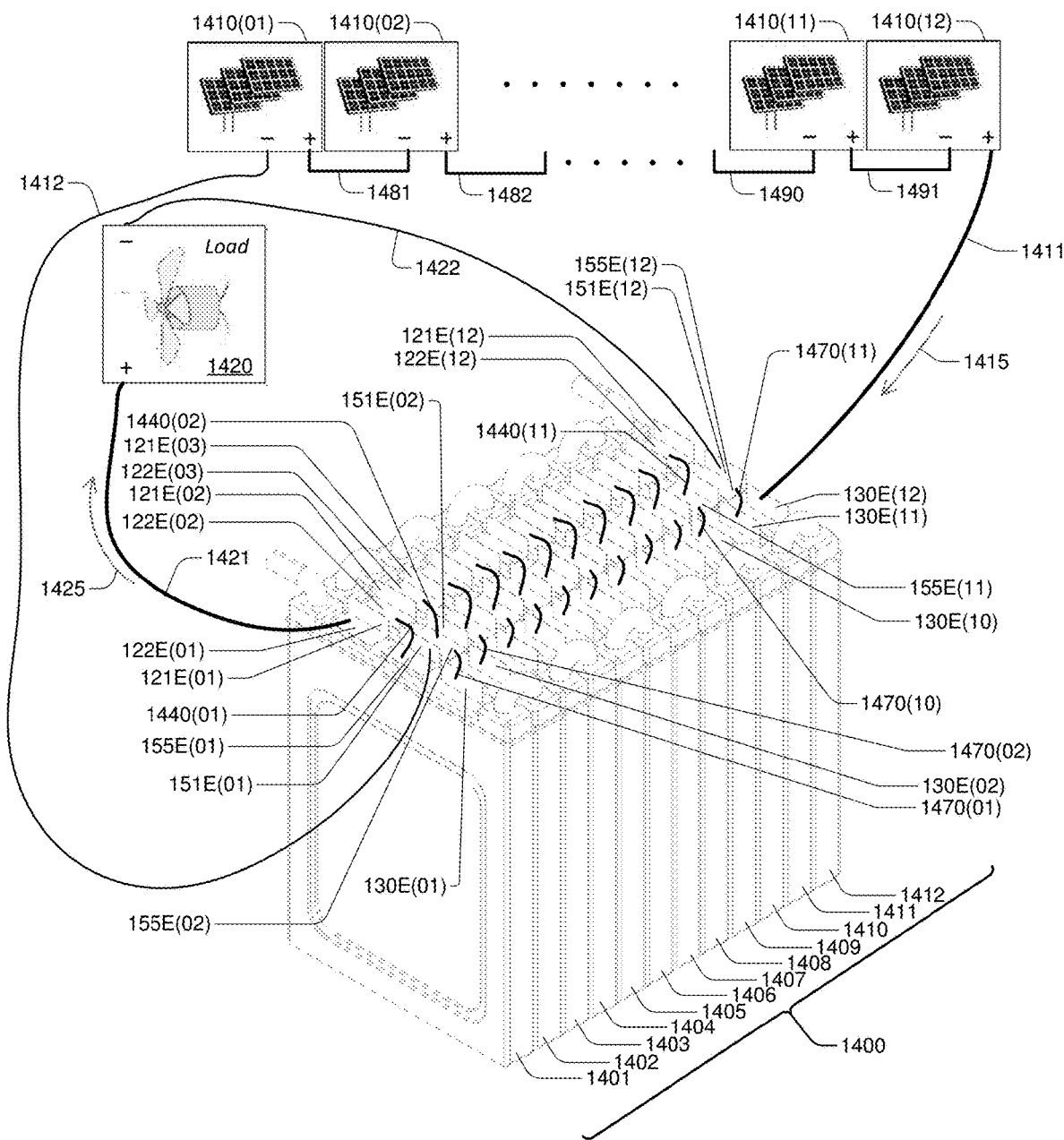
FIG. 14 illustrates another wiring configuration of a cell assembly consist of the zinc-air fuel cells wherein each is wired according to the configuration of FIG. 10A.

FIG. 14 illustrates another charging-discharging wiring configuration of the present disclosure, which involves a cell assembly 1400, a plurality of charging devices 1410(01), 1410(02), . . . , 1410(11), 1410(12), and an electrical load 1420. Same as the cell assembly 1300, the cell assembly 1400 also includes twelve fuel cells, i.e., fuel cells 1401-1412, that are arranged in a stacking structure. Each of the twelve fuel cells 1401-1412 of the cell assembly 1400 may be realized by the fuel cell 100 configured in the charging-discharging configuration 800. Namely, each of the fuel cells 1401-1412 is wired according to the wiring configuration 1091 of FIG. 10A, except that in FIG. 14 the fuel cells 1401-1412 collectively charge one electrical load, i.e., the load 1420. As shown in FIG. 14, each of the fuel cells 1401-1412 has its electrode 122E folded towards the electrode 121E and thus shorted with the electrode 121E. Also, each of the fuel cells 1401-1412 has the respective electrode 155E shorted with the electrode 151E in a similar way. That is, the left conductive layer 151 of each of the fuel cells 1401-1412 is electrically coupled to the respective right conductive layer 155, whereas the left air electrode layer 121 of each of the fuel cells 1401-1412 is electrically coupled to the respective right air electrode layer 122.

Similar to the fuel assembly 1300, the cell assembly 1400 also includes a plurality of wires that are employed to make a plurality of inter-cell connections, i.e., electrical connections between every adjacent two of the fuel cells 1401-1412. What is different from the inter-cell connections of the fuel assembly 1300 is that there are a total number of twenty-two inter-cell connections in the fuel assembly 1400. The twenty-two inter-cell connections can be divided into two sets of intern-cell connections each having eleven individual connections. Specifically, the first set of the inter-cell connections collectively place the fuel cells 1401-1412 in a serial connection with each other for the cell assembly 1400 to perform a discharging function, whereas the second set of the inter-cell connections collectively place the fuel cells 1401-1412 in a serial connection with each other for the cell assembly 1400 to perform a charging function. The first set of the eleven inter-cell connections are made by wires 1440(01), 1440(02), . . . , 1440(11), which essentially make the same inter-cell connections across the fuel cells 1401-1412 as the wires 1340(01)-1340(11) do in the fuel cell assembly 1300. That is, through the wires 1440(01)-1440(11), the electrode 155E of each of the fuel cells 1401-1412 is electrically coupled to the electrode 122E of the next fuel cell in the stacking structure.

The second set of the eleven inter-cell connections are realized by wires 1470(01), 1470(02), . . . , 1470(11) in FIG. 14. Specifically, the electrode 130E of each of the fuel cells 1401-1412 is electrically coupled to the electrode 155E of the next fuel cell in the stacking structure. For example, the wire 1470(01) is used to electrically couple the electrode 130E of the fuel cell 1401, labeled as 130E(01) in the figure, to the electrode 155E of the fuel cell 1402, labeled as 155E(02). Likewise, a wire 1470(02) is used to electrically couple the electrode 130E of the fuel cell 1402, labeled as 130E(02), to the electrode 155E of the fuel cell 1403. In this way, the second set of the inter-cell connections are carried out for every two adjacent fuel cells of the cell assembly 1400, the last connection in the second set being made by a wire 1470(11) between the electrode 130E of the fuel cell 1411, labeled as 130E(11), and the electrode 155E of the fuel cell 1412, labeled as 155E(12). Accordingly, the cell assembly 1400 includes a total of twenty-two inter-cell connections across the fuel cells 1401-1412. The first set of eleven inter-cell connections places the fuel cells 1401-1412 in a serial connection with each other for the cell assembly 1400 to perform the discharging function, while the second set of eleven inter-cell connections places the fuel cells 1401-1412 in a serial connection with each other for the cell assembly 1400 to perform the charging function. Notably, the total number of the first set of inter-cell connection wires, i.e., wires 1440(01)-1440(11), is one (1) less than the total number of the fuel cells in the cell assembly 1400. Similarly, the total number of the second set of inter-cell connection wires, i.e., wires 1470(01)-1470(11), is also one (1) less than the total number of the fuel cells in the cell assembly 1400.

The cell assembly 1400 performs the charging function by receiving a charging current from an external power source. In some embodiments, the external power source may be made of a plurality of charging devices connected in series. For example, as shown in FIG. 14, charging devices 1410 (01), 1410(02), . . . , 1410(12) are electrically coupled in series by a plurality of wires 1481, 1482, . . . , 1490 and 1491. The cell assembly 1400 performs the charging function by receiving an electric current from the external power source. As shown in FIG. 14, the charging devices 1410 (01)-1410(12), connected in series as the external power source, are electrically coupled to the cell assembly 1400 by a pair of wires 1411 and 1412, wherein the wire 1411 connects the positive terminal of the charging device 1410 (12) to the electrode 130E of the fuel cell 1412, labeled as 130E(12) in the figure, and wherein the wire 1412 connects the negative terminal of the charging device 1410(01) to the electrode 151E of the fuel cell 1401, labeled as 151E(01). The cell assembly 1400 thus performs the charging function by receiving an electric current 1415 via the wire 1411 from the charging devices 1410(01)-1410(12) that are connected in series. It is worth noting that the number of the charging devices connected in series is arbitrary. The number of the charging devices may be more than, equal to, or less than the number of fuel cells in the cell assembly 1400. In general, the more the charging devices connected in series, the cell assembly 1400 may perform the charging function by receiving a larger current 1415 and/or a higher voltage across the electrodes 130E(12) and 151E(01), thus making the charging function more efficient.

Simultaneously while performing the charging function, the cell assembly 1400 also performs the discharging function at the same time. As mentioned above, the eleven inter-cell connections (e.g., the wires 1440(01)-1440(11) in FIG. 14) essentially connect the fuel cells 1401-1412 in series for the cell assembly 1400 to perform the discharging function. For example, the cell assembly 1400 may perform the discharging function by sending an electric current 1425 to the electrical load 1420, which is electrically coupled to the cell assembly 1400 via a pair of wires 1421 and 1422. The wire 1421 is coupled between the positive terminal of the load 1420 and the electrode 122E of the fuel cell 1401, labeled as 122E(01) in the figure. The wire 1422 is coupled between the negative terminal of the load 1420 and the electrode 151E of the fuel cell 1412, labeled as 151E(12) in the figure. Namely, the electrical load 1420 is electrically coupled between the air electrode layers of the first fuel cell of the stacking structure of the cell assembly 1400(i.e., the fuel cell 1401) and the conductive layers of the last fuel cell of the stacking structure of the cell assembly 1400(i.e., the fuel cell 1412).

Accordingly, the cell assembly 1400 performs the charging function by a single charging current, i.e., the current 1415, from the charging devices 1410(01)-1410(12) that are connected in series, while simultaneously performing the discharging function by sending the electric current 1425 via the wire 1421 to drive the load 1420. It is worth noting that, the fuel cells 1401-1412 are connected in series to perform both the charging function and the discharging function.

Figure 15:
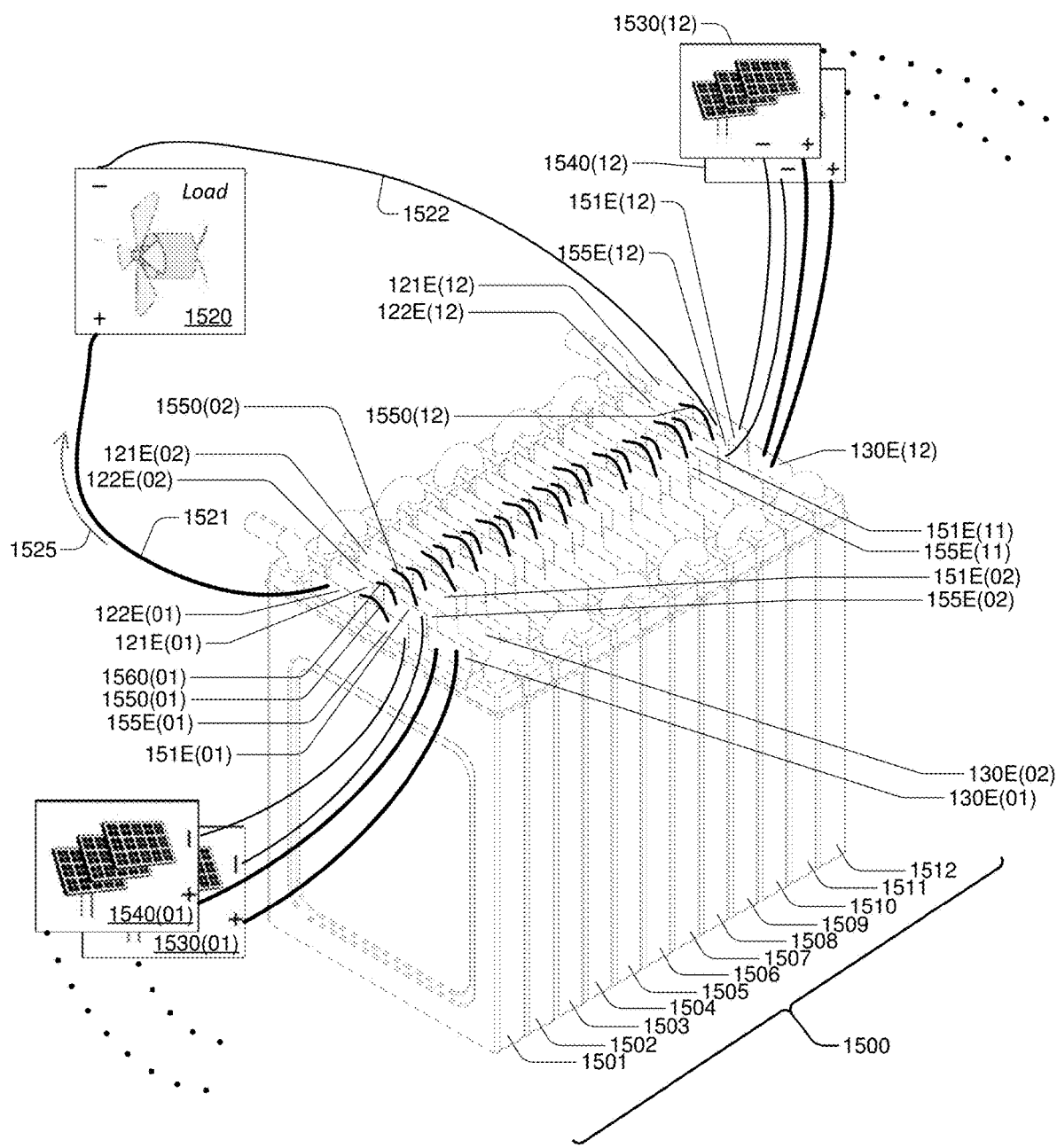
FIG. 15 illustrates a wiring configuration of a cell assembly consist of the zinc-air fuel cells wherein each is wired according to the configuration of FIG. 10C.

FIG. 15 illustrates yet another charging-discharging wiring configuration of the present disclosure, which involves a cell assembly 1500, a plurality of charging devices 1530 (01)-1530(12) and 1540(01)-1540(12), as well as an electrical load 1520. Same as the cell assembly 1300 and the cell assembly 1400, the cell assembly 1500 also includes twelve fuel cells, i.e., fuel cells 1501-1512, that are arranged in a stacking structure. Each of the twelve fuel cells 1501-1512 of the cell assembly 1500 may be realized by the fuel cell 100 configured in the charging-discharging configuration 805. For instance, each of the fuel cells 1501-1512 in FIG. 15 is wired according to the wiring configuration 1093 of FIG. 10C, except that in FIG. 15 the fuel cells 1501-1512 collectively charge one electrical load, i.e., the load 1520. It follows that, for each of the fuel cells 1501-1512, an intra-cell connection is made by a wire (e.g., the wire 1052 in FIG. 10C) that electrically shorts the electrode 121E and the electrode 155E of the respective fuel cell. For example, a wire 1550(01) realizes the intra-cell connection for the fuel cell 1501, and a wire 1550(02) realizes the intra-cell connection for the fuel cell 1502. The intra-cell connection is realized for each fuel cell in the stacking structure of the cell assembly 1500, with the last intra-cell connection being made by a wire 1550(12) that electrically shorts the electrode 121E, labeled as 121E(12) in FIG. 15, and the electrode 155E, labeled as 155E(12), of the fuel cell 1512. The cell assembly 1500 thus includes a total of twelve intra-cell connections, realized by the wires 1550(01), 1550(02), . . . , 1550(12). Notably, the total number of the intra-cell connection wires is equal to the total number of the fuel cells in the cell assembly 1500. Also notably, the cell assembly 1500 is different from the cell assemblies 1300 and 1400 in that, for each of the fuel cells 1501-1512, the left conductive layer 151 is not electrically shorted to the respective right conductive layer 155. Likewise, the left air electrode layer 121 of each of the fuel cells 1501-1512 is not electrically shorted to the respective right air electrode layer 122.

In addition to the intra-cell connections, the cell assembly 1500 also includes a plurality of wires that are employed to make inter-cell connections. Specifically, the cell assembly 1500 includes a total of eleven inter-cell connections, each of which electrically couples the electrode 151E of a fuel cell to the electrode 122E of the next fuel cell in the stacking structure of the cell assembly 1500. For example, a wire 1560(01) is used to electrically short the electrode 151E of the fuel cell 1501, labeled as 151E(01) in FIG. 15, to the electrode 122E of the fuel cell 1502, labeled as 122E(02) in the figure. An inter-cell connection is realized in a same way for each of the rest of the fuel cells of the cell assembly 1500, i.e., between the electrode 151E of the fuel cell 1502 and the electrode 122E of the fuel cell 1503, between the electrode 151E of the fuel cell 1503 and the electrode 122E of the fuel cell 1504, and so forth, with the last inter-cell connection being the one between the electrode 151E of the fuel cell 1511, labeled as 151E(11) in the figure, and the electrode 122E of the fuel cell 1512, labeled as 122E(12) in the figure. Notably, the total number of the inter-cell connection wires is one (1) less than the total number of the fuel cells in the cell assembly 1500.

The cell assembly 1500 performs the charging function by each of the fuel cells 1501-1512 respectively receiving two charging currents from two external power source. For example, the fuel cell 1501 receives two charging currents, one from the charging device 1530(01) and the other from the charging device 1540(01). The charging devices 1530 (01) and 1540(01) are wired to the fuel cell 1501 according to the wiring configuration 1093 of FIG. 10C. In fact, each of the fuel cells 1501-1512 is wired according to the wiring configuration 1093, the last being the fuel cell 1512, which is wired to the charging devices 1530(12) and 1540(12).

Simultaneously while performing the charging function, the cell assembly 1500 may also perform the discharging function at the same time. Specifically, the cell assembly 1500 may perform the discharging function by sending an electric current 1525 to the electrical load 1520, which is electrically coupled to the cell assembly 1500 via a pair of wires 1521 and 1522. The wire 1521 is coupled between the positive terminal of the load 1520 and the electrode 122E of the fuel cell 1501, labeled as 122E(01) in FIG. 15. The wire 1522 is coupled between the negative terminal of the load 1520 and the electrode 151E of the fuel cell 1512, labeled as 151E(12) in the figure. Namely, the electrical load 1520 is electrically coupled between the second air electrode layer of the first fuel cell of the stacking structure of the cell assembly 1500(i.e., the fuel cell 1501) and the first conductive layer of the last fuel cell of the stacking structure of the cell assembly 1500(i.e., the fuel cell 1512).

The twelve intra-cell connections and the eleven inter-cell connections of the cell assembly 1500 collectively place the fuel cells 1501-1512 in a serial connection such that the electrochemical reaction within the left space 101 and the electrochemical reaction within the right space 102 of each fuel cell therein are electrically connected in series across the fuel cells 1501-1512. That is, the batteries 701 and 702, as modeled in the circuit model 700, of each of the fuel cells 1501-1512 are thus connected in series, resulting a total of twenty-four half spaces electrically connected in series, with each of the half space (i.e., the left space 101 or the right space 102) charged by one of the charging devices 1530 (01)-1530(12) and 1540(01)-1540(12). This wiring configuration essentially doubles the output voltage provided by the cell assembly to the load as compared to that provided by the configuration of FIG. 13 or FIG. 14, making the wiring configuration of FIG. 15 a proper choice when a higher output voltage is required to drive the load. For example, suppose the electrochemical reaction within each of the half space, modeled by the battery 701 or 702, can generate a voltage of 1 volt (V), the cell assembly 1500 will this be able to provide a total of 24 V across the positive and negative terminals of the load 1520. In comparison, each of the cell assembly 1300 and the cell assembly 1400 can only provide a total of 12 V across the load 1320 and 1420, respectively.

It is worth noting that, while the fuel cells and cell assemblies according to the present disclosure are capable of performing a charging function and a discharging function simultaneously, it is not a requirement for using any of the fuel cell or cell assembly of the present disclosure. That is, each fuel cell or cell assembly described herein can be used to perform only one of the charging function and the discharging function, although the performing of both the charging function and the discharging function simultaneously is possible and in many applications desirable. Depending on specific requirement of usage, each fuel cell or cell assembly of the present disclosure can perform the charging function, the discharging function, or both at any time.

Characteristics and benefits of the present disclosure are described with reference to various embodiments detailed above. Accordingly, the present disclosure should not be limited to these exemplary embodiments illustrating combinations of some possible unlimiting features that may exist individually or in the form of other combinations of features.

The embodiments described above are merely demonstrate certain exemplary embodiments of the present disclosure, which are used to illustrate the technical solution of the problem to be addressed, rather than to limit the present disclosure in any way. The protection scope of the present disclosure is not limited to the exemplary embodiments. Although the present disclosure has been described in detail with reference to the above-mentioned embodiments, a person skilled in the art should understand that any person familiar with the technical solution disclosed in the present disclosure is able to modify or change the technical solution recorded in the above-mentioned embodiments, and equally replace some technical features of the present disclosure. Nevertheless, these modifications, changes and substitutions do not separate the essence of the corresponding technical solutions from the spirit and scope of the technical solutions of the present disclosure, and are covered in the protection scope of the present application. Therefore, the protection scope of the present application shall be subject to the protection scope of the claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of simultaneously performing a charging function and a discharging function with a fuel cell, the fuel cell comprising:
    a case forming a space that is internal to the fuel cell;
    a metal layer disposed in the space and serving as a positive electrode for the charging function;
    two air electrode layers disposed in the space and serving as positive electrodes for the discharging function;

a zinc material disposed in the space and serving as a negative electrode for the charging function and the discharging function;

a plurality of separators disposed in the space, respectively disposed between the air electrode layers, the zinc material and the metal layer so that the air electrode layers, the zinc material and the metal layer are separately arranged; and an electrolyte disposed in the space, the electrolyte capable of flowing to pass through the separators and in contact with the air electrode layers, with the metal layer and with the zinc material so that the air electrode layers, the zinc material and the metal layer are respectively electrically connected; and a plurality of gas chambers disposed in the space, wherein the electrolyte is disposed in the space via at least one of the plurality of gas chambers that are configured to pass but not to hold the electrolyte, and wherein the electrolyte is disposed in the space up to a level that is located lower than the plurality of gas chambers;

the method comprising:
providing the fuel cell;
providing a charging device having a positive terminal and a negative terminal;
providing an electrical load having a positive terminal and a negative terminal;
electrically coupling the positive terminal of the charging device to the metal layer of the fuel cell;
electrically coupling the positive terminal of the electrical load to the two air electrode layers; and
electrically coupling the negative terminal of the charging device and the negative terminal of the electrical load to the zinc material.

2. The method of claim 1, wherein the charging device comprises a solar panel, or wherein the charging device comprises a wind turbine generator.

3. The method of claim 1, wherein the two air electrode layers are electrically coupled with one another by an L-shaped conductor.

4. The method of claim 1, wherein the fuel cell further comprises two conductive layers each disposed on a respective side of the metal layer, and wherein each of the two conductive layers has a central recessed region for accommodating the zinc material.

5. The method of claim 4, wherein the conductive layers are electrically coupled with one another by an L-shaped conductor.

6. A method of simultaneously performing a charging function and a discharging function with a fuel cell,
the fuel cell comprising:
a case forming a space that is internal to the fuel cell;
a metal layer disposed in the space and serving as a positive electrode for the charging function;
a first air electrode layer and a second air electrode layer disposed in the space and serving as positive electrodes for the discharging function, the first and second air electrode layers disposed on two opposite sides of the metal layer;
a zinc material disposed in the space and serving as a negative electrode for the charging function and the discharging function;
a first conductive layer and a second conductive layer each disposed between the metal layer and one of the first air electrode layer and the second air electrode layer, each of the first and second conductive layers having a central recessed region for accommodating the zinc material;
a plurality of separators respectively disposed between the first and second air electrode layers, the first and second conductive layers and the metal layer so that the first and second air electrode layers, the first and second conductive layers and the metal layer are separately arranged;
an electrolyte disposed in the space, the electrolyte capable of flowing to pass through the separators and in contact with the air electrode layers, with the metal layer and with the zinc material so that the air electrode layers, the zinc material and the metal layer are respectively electrically connected; and
a plurality of gas chambers disposed in the space,
wherein the electrolyte is disposed in the space via at least one of the plurality of gas chambers that are configured to pass but not to hold the electrolyte, and
wherein the electrolyte is disposed in the space up to a level that is located lower than the plurality of gas chambers;

the method comprising:
providing the fuel cell;
providing a first charging device and a second charging device each having a positive terminal and a negative terminal;
providing an electrical load having a positive terminal and a negative terminal;
electrically coupling the positive terminal of each of the first and second charging devices to the metal layer of the fuel cell;
electrically coupling the positive terminal of the electrical load to the first air electrode layer;
electrically coupling the negative terminal of the first charging device to the zinc material accommodated at the central recessed region of the first conductive layer;
electrically coupling the negative terminal of the second charging device and the negative terminal of the electrical load to the zinc material accommodated at the central recessed region of the second conductive layer; and
electrically coupling the second air electrode layer to the zinc material accommodated at the central recessed region of the first conductive layer.

7. The method of claim 6, wherein the charging device comprises a solar panel, or wherein the charging device comprises a wind turbine generator.

8. A cell assembly capable of simultaneously performing a charging function and a discharging function, the cell assembly comprising a plurality of fuel cells arranged in a stacking structure, each of the plurality of fuel cells comprising:
a case forming a space that is internal to the respective fuel cell;
a metal layer disposed in the space and serving as a positive electrode for the charging function;
an air electrode layer disposed in the space and serving as a positive electrode for the discharging function;
a zinc material disposed in the space and serving as a negative electrode for the charging function and the discharging function;
a plurality of separators respectively disposed between the air electrode layer, the zinc material and the metal layer so that the air electrode layer, the zinc material and the metal layer are separately arranged; and an electrolyte capable of flowing to pass through the separators and in contact with the air electrode layers, with the metal layer and with the zinc material so that the air electrode layers, the zinc material and the metal layer are respectively electrically connected;
a plurality of gas chambers disposed in the space; and
a plurality of inter-cell connection wires,
wherein the electrolyte is disposed in the space via at least one of the plurality of gas chambers that are configured to pass but not to hold the electrolyte,
wherein the electrolyte is disposed in the space up to a level that is located lower than the plurality of gas chambers, and
wherein each of the plurality of inter-cell connection wires electrically couples the zinc material of a respective fuel cell in the stacking structure to the air electrode layer of a next fuel cell in the stacking structure.

9. The cell assembly of claim 8, wherein a total number of the inter-cell connection wires is one less than a total number of the fuel cells in the stacking structure.

10. The cell assembly of claim 8, wherein the cell assembly performs the charging function by receiving a respective electric current at the metal layer of each of the plurality of fuel cells.

11. The cell assembly of claim 8, wherein the cell assembly is capable of driving an electrical load that is electrically coupled between the air electrode layer of a first fuel cell in the stacking structure and the zinc material of a last fuel cell in the stacking structure, and wherein the cell assembly performs the discharging function by sending an electric current to the electrical load from the air electrode layer of the first fuel cell.

12. The cell assembly of claim 8, wherein:
the plurality of inter-cell connection wires is a first set of inter-cell connection wires,
the cell assembly further comprises a second set of inter-cell connection wires, and
each of the second set of inter-cell connection wires electrically couples the metal layer of the respective fuel cell in the stacking structure to the zinc material of the next fuel cell in the stacking structure.

13. The cell assembly of claim 12, wherein a total number of the second set of inter-cell connection wires is one less than a total number of the fuel cells in the stacking structure.

14. The cell assembly of claim 12, wherein the cell assembly performs the charging function by receiving an electric current at the metal layer of a last fuel cell in the stacking structure, and wherein the electric current is provided by an external power source that is electrically coupled between the metal layer of the last fuel cell in the stacking structure and the zinc material of a first fuel cell in the stacking structure.

15. The cell assembly of claim 14, wherein the external power source comprises a plurality of charging devices connected in series.

16. The cell assembly of claim 12, wherein the cell assembly is capable of driving an electrical load that is electrically coupled between the air electrode layer of a first fuel cell in the stacking structure and the zinc material of a last fuel cell in the stacking structure, and wherein the cell assembly performs the discharging function by sending an electric current to the electrical load from the air electrode layer of the first fuel cell.

17. The cell assembly of claim 8, wherein the air electrode layer is a second air electrode layer, the cell assembly further comprising:
a first air electrode layer, each of the first and second air electrode layers disposed on two opposite sides of the metal layer;
a first conductive layer;
a second conductive layer; and
a plurality of intra-cell connection wires,
wherein:
each of the first and second conductive layers has a central recessed region for accommodating the zinc material,
the first conductive layer is disposed between the metal layer and the first air electrode layer,
the second conductive layer is disposed between the metal layer and the second air electrode layer,
each of the plurality of inter-cell connection wires couples the zinc material of the respective fuel cell in the stacking structure to the air electrode layer of the next fuel cell in the stacking structure by coupling the first conductive layer of the respective fuel cell to the second air electrode layer of the next fuel cell, and
each of the plurality of intra-cell connection wires electrically couples the first air electrode of the respective fuel cell to the second conductive layer of the respective fuel cell.

18. The cell assembly of claim 17, wherein the cell assembly performs the charging function by each of the plurality of fuel cells receiving two electric currents at the metal layer thereof, wherein the two electric currents are provided by two charging devices each coupled between the metal layer and each of the first and second conductive layers of the respective fuel cell.

19. The cell assembly of claim 17, wherein the cell assembly is capable of driving an electrical load that is electrically coupled between the second air electrode layer of a first fuel cell in the stacking structure and the first conductive layer of a last fuel cell in the stacking structure, and wherein the cell assembly performs the discharging function by sending an electric current to the electrical load from the second air electrode layer of the first fuel cell.

20. The cell assembly of claim 17, wherein a total number of the inter-cell connection wires is one less than a total number of the fuel cells in the stacking structure, and wherein a total number of the intra-cell connection wires is equal to the total number of the fuel cells in the stacking structure.

* * * * *